United States Patent
Tajima et al.

(10) Patent No.: US 8,437,243 B2
(45) Date of Patent: May 7, 2013

(54) OPTICAL INFORMATION RECORDING MEDIUM

(75) Inventors: Hideharu Tajima, Osaka (JP); Atsushi Etoh, Osaka (JP); Hiroaki Ashiwa, Ibaraki (JP); Makoto Suzuki, legal representative, Ibaraki (JP); Ryo Kojima, Ibaraki (JP); Masahito Konishi, Ibaraki (JP); Isamu Kuribayashi, Tokyo (JP)

(73) Assignees: Sharp Kabushiki Kaisha, Osaka (JP); Memory-Tech Corporation, Ibaraki (JP); TDK Corporation, Tokyo (JP)

( * ) Notice: Subject to any disclaimer, the term of this patent is extended or adjusted under 35 U.S.C. 154(b) by 0 days.

(21) Appl. No.: 13/384,069

(22) PCT Filed: Jul. 15, 2010

(86) PCT No.: PCT/JP2010/062002
§ 371 (c)(1),
(2), (4) Date: Jun. 15, 2012

(87) PCT Pub. No.: WO2011/007841
PCT Pub. Date: Jan. 20, 2011

(65) Prior Publication Data
US 2012/0263029 A1 Oct. 18, 2012

(30) Foreign Application Priority Data

Jul. 17, 2009 (JP) .................................. 2009-169568
Jul. 15, 2010 (JP) .................................. 2010-160515

(51) Int. Cl.
*G11B 3/70* (2006.01)
*G11B 7/04* (2006.01)

(52) U.S. Cl.
USPC ..................................... 369/283; 369/275.3

(58) Field of Classification Search .... 369/275.1–275.5, 369/30.1, 284, 100, 47.5, 30.03, 283, 288, 369/286
See application file for complete search history.

(56) References Cited

U.S. PATENT DOCUMENTS

| 5,708,653 A | 1/1998 | Okada et al. |
| 2004/0234720 A1 | 11/2004 | Hayashida et al. |

(Continued)

FOREIGN PATENT DOCUMENTS

| JP | 09-106546 A | 4/1997 |
| JP | 2004-103183 A | 4/2004 |

(Continued)

OTHER PUBLICATIONS

International Search Report for International Application PCT/JP2010/062002 (Oct. 5, 2010).

(Continued)

*Primary Examiner* — Ali Neyzari
(74) *Attorney, Agent, or Firm* — Edwards Wildman Palmer LLP; David G. Conlin; Steven M. Jensen

(57) ABSTRACT

An optical information recording medium (1) includes on a substrate (50), a ROM layer (20), a RE layer (40), an intermediate layer (30) separating the ROM layer (20) and the RE layer (40), and a light transmitting layer (10) provided farthest from the substrate (50). The RE layer (40) is an information recording layer provided most farthest from the light transmitting layer (10), and is a recording layer of BCA recorded in a format easily determinable as compared to an information recording format used in the ROM layer (20), and antifouling property of a surface of the light transmitting layer (10) is set based on the RE layer (40). This makes it easy for the recording and reproducing apparatus to confirm a disc type, allows for sharing one recording and reproducing apparatus with other types of optical discs, and simplifies the disc production. Furthermore, an optical information recording medium is accomplished, in which outdated data on the ROM layer is replaced by recording, on the RE layer, updated data obtained while Internet connection can be established.

12 Claims, 10 Drawing Sheets

U.S. PATENT DOCUMENTS

| | | | |
|---|---|---|---|
| 2004/0240363 A1* | 12/2004 | Kuroda et al. | 369/59.19 |
| 2004/0264360 A1* | 12/2004 | Lee et al. | 369/275.4 |
| 2005/0078577 A1* | 4/2005 | Horie | 369/47.28 |
| 2005/0147006 A1 | 7/2005 | Hayashida et al. | |
| 2005/0170135 A1 | 8/2005 | Hayashida et al. | |
| 2006/0153050 A1* | 7/2006 | Mijiritskii | 369/275.1 |
| 2006/0159857 A1 | 7/2006 | Hayashida et al. | |
| 2007/0019533 A1* | 1/2007 | Ogawa et al. | 369/275.3 |
| 2007/0105227 A1 | 5/2007 | Hayashida et al. | |
| 2008/0232232 A1* | 9/2008 | Kuroda et al. | 369/275.3 |
| 2011/0273970 A1 | 11/2011 | Tajima et al. | |
| 2012/0127840 A1* | 5/2012 | Arimoto et al. | 369/30.03 |

FOREIGN PATENT DOCUMENTS

| | | |
|---|---|---|
| JP | 2006-120318 A | 5/2006 |
| JP | 2008-152914 A | 7/2008 |
| JP | 2008-287883 A | 11/2008 |
| JP | 2009-102513 A | 5/2009 |
| JP | 2010-186531 A | 8/2010 |
| WO | 2009/014190 A1 | 1/2009 |
| WO | 2009/035058 A1 | 3/2009 |

OTHER PUBLICATIONS

Standard ECMA-382, 120 mm (8,54 Gbytes per side) and 80 mm (2,66 Gbytes per side) DVD Recordable Disk for Dual Layer (DCD-R for DL), 2nd Edition, Jun. 2010.

Standard ECMA-267, 120 mm DVD Read-Only Disk, 3rd Edition, Apr. 2001.

Standard ECMA-384, 120 mm (8,54 Gbytes per side) and 80 mm (2,66 Gbytes per side) DVD Re-recordable Disk for Dual Layer (DVD-RW for DL), 1st Edition, Dec. 2008.

* cited by examiner

F I G. 2
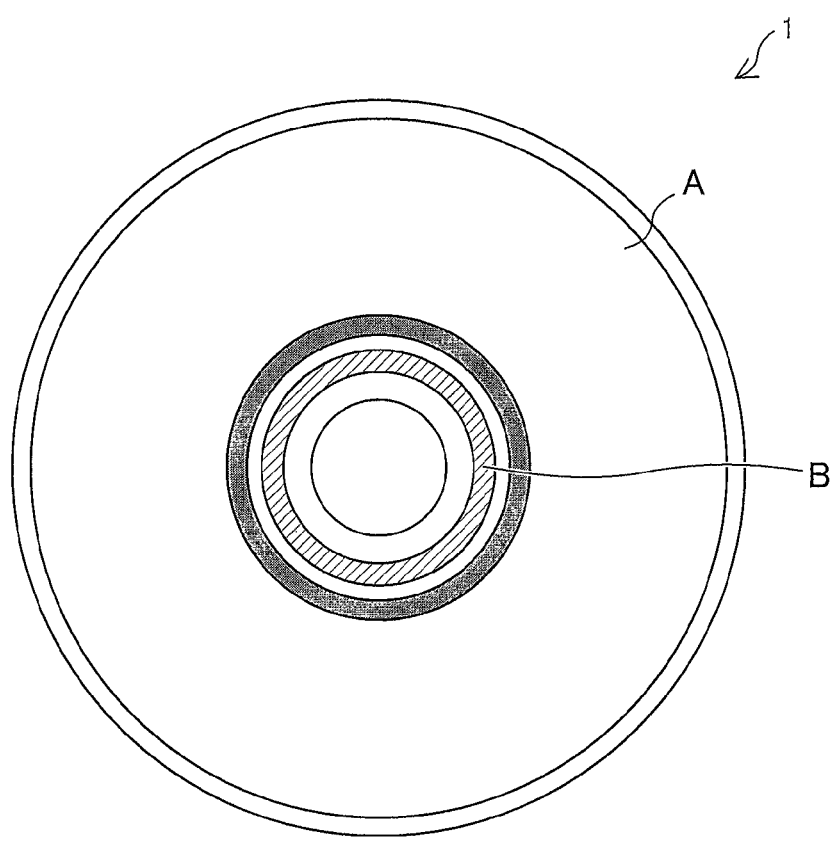

(a)

(b)

(c)

F I G. 7
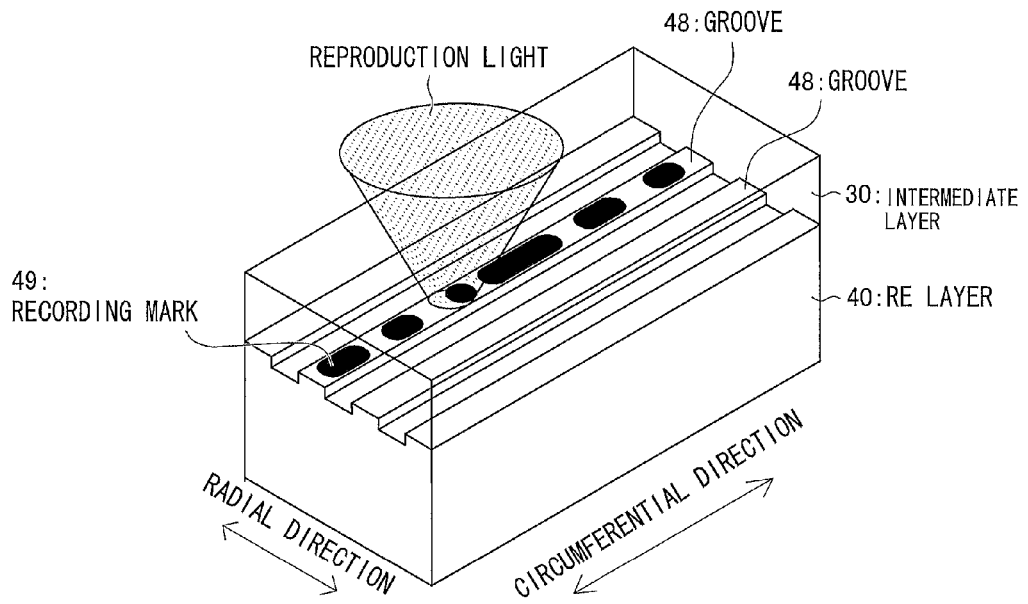
F I G. 8
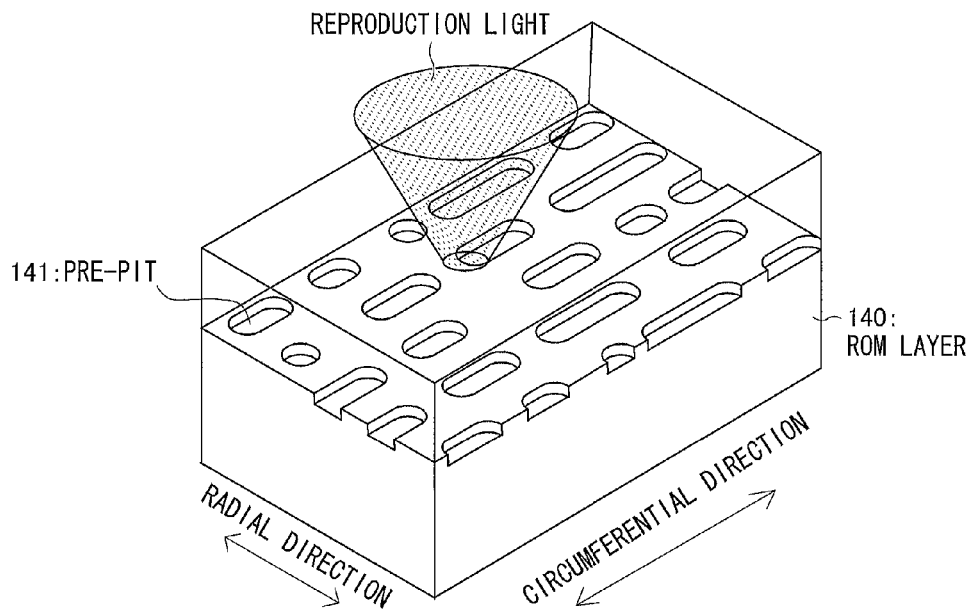

F I G. 9
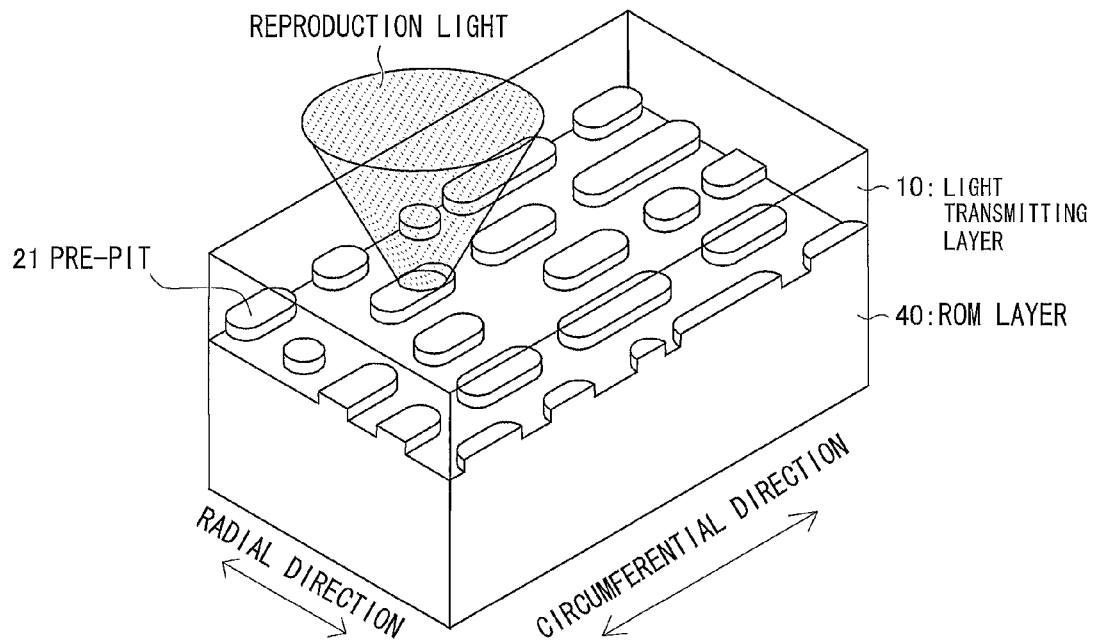
F I G. 10
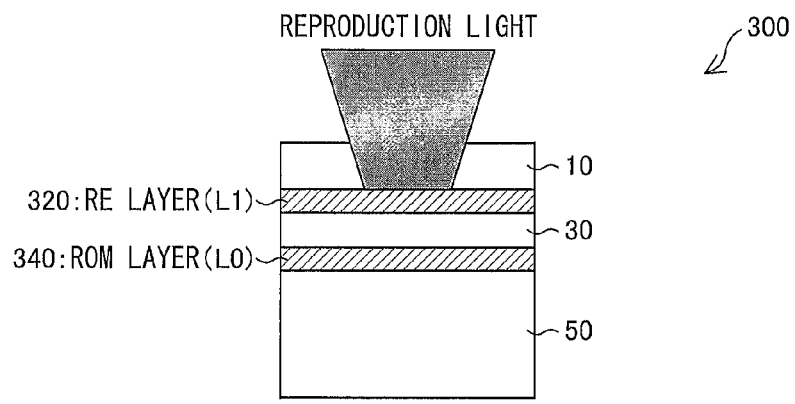

【IMAGE OF CURRENT DL STANDARD】

(a)

(b)

F I G. 1 4
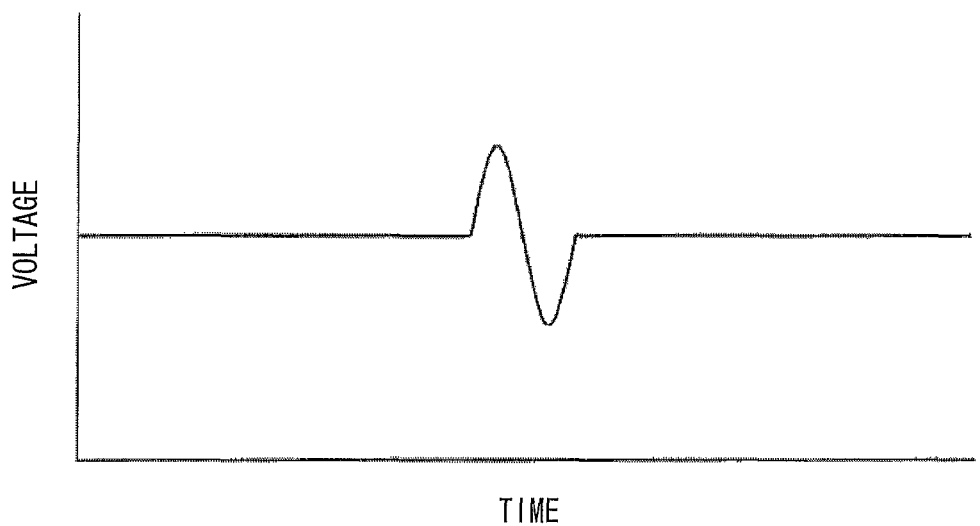

OPTICAL INFORMATION RECORDING MEDIUM

TECHNICAL FIELD

The present invention relates to an optical information recording medium.

BACKGROUND ART

Combination discs (multilayer optical discs in which a ROM (reproduction-only) layer and a RE (recording and reproducing) layer are mixedly present) are currently in the need. Reasons for this need are for example as follows. In car navigation software, Internet connection cannot be always established, and since it takes time to download all map information, it is preferable to distribute the car navigation software in the form of a low-cost ROM. On the other hand, map information changes daily, so therefore it is preferable that the map information can be updated newly via the Internet. Accordingly, a combination disc which can solve both these problems has been in the need, which combination disc allows for replacing outdated data on the ROM layer with updated data, by recording updated data onto the RE layer while connection to the Internet is available.

In order to obtain the combination disc, it has been considered preferable to provide a ROM layer generally having a higher reflectance than the RE layer, since loss occurs in light returning from an information recording layer (hereinafter, referred to as L0 layer) provided in a farthest position from the reproduction light incident surface, which loss is caused by the presence of other information recording layers, as disclosed in Patent Literature 1.

Moreover, one standard of the optical disc includes a plurality of types such as ROM, R, RW, and RE, and there are various versions (disc types) such as having two layers of the information recording layers to improve recording capacity. Furthermore, on assumption that such combination discs are used for car navigation software as described above, it is preferable that while the car navigation software is not being used, the recording and reproducing apparatus can reproduce rental movie software (ROM) or a disc (R, RW, RE) on which a drama is recorded domestically. Hence, the recording and reproducing apparatus requires having means for identifying a type of the disc as easily as possible, when a disc is loaded therein.

A system in which a barcode is printed outside an information recording area has been considered as the means for identifying the disc type. However, for the reasons described later, it is preferable to record information after the disc has been completed and in a manner such that no correction can be made after addition of the information. Hence, substantially, it is preferable to carry out a recording onto the disc by use of light irradiation, such as BCA recording (recording of information by irradiating an information recording layer with pulse laser light by a YAG laser or the like, whereby forming stripes having for example a width of approximately 10 μm and a length of approximately several hundred μm (as like a barcode)).

Patent Literature 1 discloses a combination disc including a transparent substrate, a RE layer, an intermediate layer, a ROM layer, and a protective resin film, which layers are stacked in this order from a reproduction light incident surface.

In order to obtain a combination disc as like the one disclosed in Patent Literature 1, it is generally preferable to provide a ROM layer having a reflectance higher than that of the RE layer, since loss occurs in light which returns from the information recording layer (L0) that is disposed in the farthest position from the reproduction light incident surface, due to the presence of other information recording layers.

Moreover, Non Patent Literature discloses, as a method of identifying the disc type, a method (BCA) in which information is recorded in the form of recording marks whose size allows the identification of the disc type even in a case where a value of a beam expander and/or a focusing or tracking state are not optimum.

Citation List

Patent Literature
Patent Literature 1
Japanese Patent Application Publication, Tokukaihei, No. 9-106546 A (Publication Date: Apr. 22, 1997)
Patent Literature 2
Japanese Patent Application Publication, Tokukai, No. 2006-120318 A (May 11, 2006)
Non Patent Literature
Non Patent Literature 1
(Standard ECMA-267, -382, -384)

SUMMARY OF INVENTION

Technical Problem

However, the technique disclosed in Non Patent Literature (DVD Standard) has a problem that where the BCA recording is carried out varies depending on the disc type. For example, a DVD-ROM has the recording layer for carrying out BCA recording be provided on an information recording layer that is provided on a substrate far from the light incident surface, and a double-layer DVD-R, -RW has the recording layer for carrying out BCA recording be provided on an information recording layer that is provided on a substrate closer to the light incident surface. Namely, in the recording and reproducing apparatus, on which layer of the disc the BCA is provided cannot be set in advance, so accordingly, when the BCA is to be reproduced, a certain amount of focus searching is required to determine the recorded layer.

Moreover, with a combination disc in which a ROM layer is provided on an information recording layer (L0) provided in a farthest position from the reproduction light incident surface as disclosed in Patent Literature 1, there is a problem that it is difficult to carry out the BCA recording onto a layer farthest from the reproduction light incident surface, due to the following reasons.

In a multi-layer disc in the form of a BD whose capacity can be more easily increased as compared to a DVD type disc, a layer onto which information is recorded is a single-plate optical disc. Therefore, an information recording layer is always provided on a substrate.

This is because, with a plural plate optical disc such as a DVD in which two substrates are adhered together, no difference in cost or the like is caused regardless of which substrate surface the information recording layer is provided on. However, with a single-plate optical disc, in order to arrange two layers of the information recording layers, it is necessary to provide an intermediate layer on the information recording layer provided on the substrate, to further provide another information recording layer. Therefore, in the case of the single-plate optical disc, it is substantially impossible to provide an intermediate layer without providing an information recording layer on the substrate, in view of cost.

Namely, according to the standards of the BD type optical disc, an information recording layer is always provided on the substrate. Hence, the recording and reproducing apparatus for reproducing information recorded on the information recording layer can easily predict a location where the information is recorded, thereby making it possible to set the BCA (Burst cutting area) reproduction in advance. This makes it easier to share (including just recognizing the disc type) one recording and reproducing apparatus among various types of mediums that comply with a single standard.

However, in order to obtain what is described above, the combination disc disclosed in Patent Literature 1 had the following problems.

First, it is preferable that the BCA recording (recording of information by irradiating the information recording layer with pulse laser light by a YAG laser or the like, whereby forming stripes having for example a width of approximately 10 μm and a length of approximately several hundred μm (as like a barcode)) is recorded at a specific position so that reproduction can be easily carried out. Furthermore, with the BD format, it is preferable that the BCA recording is to be recorded in the position of L0, for the following reasons.

Moreover, in terms of reducing cost, it is preferable to simultaneously record, in the BCA recording, an individual identification number of the disc which allows for preventing unauthorized dubbing onto the RE layer.

Furthermore, if the individual identification number is to be recorded, in view of production management, it is preferable that the individual identification number is recorded upon completion of the disc.

Namely, the BCA recording is substantially required to be recorded on a disc in a completed state. Although explained later in detail, in the BCA recording, a laser output required for recording onto the ROM layer significantly differs from that for recording onto the RE layer. The reason for this difference is as described below. When information is recorded onto the RE layer, recording marks are just changed in phase from a crystalline state to an amorphous state, as with a regular information recording. However, with the ROM layer, usually just a metal reflective film is provided in view of cost. This configuration disenables the phase change. Consequently, recording is carried out by having the metal film be burned through; this requires a laser of a greater output.

On the other hand, in the double-layer RE disc, when the BCA recording is carried out onto L0, a phase change also may occur in at least the RE layer (L1) immediately above the L0 layer, due to heat caused by the high output laser which is transmitted to the L0 layer.

Hence, in a combination disc in which at least the L0 layer is a ROM layer, since the L0 layer is provided at a farthest position from the light incident surface among the information recording layers, in BCA recording, the beam always passes through other information recording layers. This means that the beam passes through a RE layer which is definitely present in any one of the layers, while the beam passes through to the L0 layer. Although details are later described, in this case, the RE layer more easily absorbs light than the ROM layer, thereby causing an increase in temperature of the RE layer. This heat causes a phenomenon that the light transmitting layer peels off from the RE layer. The occurrence of such a phenomenon makes it difficult to have focus on the L0 layer. As a result, the information that is BCA recorded on the L0 layer cannot be properly reproduced.

Moreover, the combination disc in which the L0 layer is a ROM layer also had the possibility of reproduction failure, due to the reason described below.

Usually, a ROM disc and a RE disc have different signal modulation factors, and the ROM disc has a higher signal modulation factor. Thus, the tolerance against noise caused by adherence of fingerprints and dust on the light incident surface or scratches on the light incident surface and the like, differs between the ROM disc and the RE disc. Hence, in a case where the antifouling property and mar-proof property of the surface of the light transmitting layer only suits the ROM layer, recording onto the RE layer and reproduction of information from the RE layer may not be carried out properly.

In view of the above problems, an object of the present invention is to provide an optical information recording medium which can share a recording and reproducing apparatus with other various kinds of media according to a same standard (media that are different in R, RE, and R and/or the number of layers), which optical information recording medium can distribute a large capacity of information at low cost and can be updated on demand by updated data.

Solution to Problem

In order to attain the object, an optical information recording medium according to the invention includes, on a substrate: a plurality of information recording layers from which information can be read out by reproduction light; an intermediate layer separating each of the plurality of information recording layers; and a light transmitting layer provided in a position farthest from the substrate, the plurality of information recording layers including a layer allowing only readout of information and a rewritable layer including an area where information is rewritable, the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having pre-pits formed in a recording format in which a polarity of a push-pull signal obtained when provided information is reproduced is positive, and the light transmitting layer having a surface configuration and/or material selected so as to be one with antifouling property and mar-proof property set based on the rewritable layer.

In order to attain the object, an optical information recording medium according to the invention includes, on a substrate: a plurality of information recording layers from which information can be read out by reproduction light; an intermediate layer separating each of the plurality of information recording layers; and a light transmitting layer provided in a position farthest from the substrate, the plurality of information recording layers including a layer allowing only readout of information and a rewritable layer including an area where information is rewritable, the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having information recorded thereon in an on-pit format, and the light transmitting layer having a surface configuration and/or material selected so as to be one with antifouling property and mar-proof property set based on the rewritable layer.

The disc-type identification information is information for identifying a disc type. Namely, the disc-type identification information is information indicative of the number of information recording layers provided on the disc, the types (e.g. ROM, R, RE) of the provided information recording layers, and information of dispositions of a layer allowing only read-out of the information (hereinafter, referred to as ROM layer) and a rewritable layer (hereinafter, referred to as RE layer) including an area in which the information is rewritable, among the plurality of information recording layers. The disc-type identification information is information for identifying the type of the optical information recording medium.

Moreover, the individual identification number is a number for identifying an individual optical information recording medium, and it is preferably recorded on the optical information recording medium at the same time as the BCA recording. By use of the individual identification number as appropriate, it is possible to prevent any unauthorized dubbing or the like onto the RE layer.

According to the configuration, the disc-type identification information and the individual identification information are recorded on an information recording layer (hereinafter, referred to as L0 layer) provided in a position farthest from the light transmitting layer.

Hence, it is possible, in a reproducing apparatus by which the disc-type identification information and the individual identification information are reproduced, to have the layer on which the disc-type identification information and the individual identification information are recorded be set in advance among the plurality of the information recording layers. This allows for shortening the time required for the reproducing apparatus to specify the layer on which the disc-type identification information and the individual identification information are recorded among the plurality of information recording layers. Furthermore, it becomes easy to share a single reproducing apparatus among optical information recording mediums of various disc types.

Moreover, according to the configuration, the information recording layer provided at a position farthest from the light transmitting layer is a RE layer. Namely, according to the configuration, the RE layer is disposed as the L0 layer.

Accordingly, it is possible to prevent the RE layer from being peeled off from the intermediate layer or the light transmitting layer disposed as an upper layer or lower layer of the RE layer, which peeling off occurs in the case where the ROM layer is disposed as the L0 layer and at a time when BCA is recorded on the ROM layer. This as a result allows for the reproducing apparatus and like apparatus to properly reproduce the disc-type identification information, the individual identification number, and like information, which are BCA recorded onto the L0 layer.

Furthermore, in the configuration, information is recorded on the ROM layer in an on-pit format. Namely, pre-pits formed on the ROM layer are shaped of protrusions.

Hence, it is possible to reproduce information on the ROM layer and prevent reproduction failure of the combination disc, even if the reproducing apparatus fails to jump from the ROM layer to the RE layer during reproduction by the reproducing apparatus and the ROM layer is again focused by mistake, caused by reasons described later.

This allows for preventing reproduction failure in the combination disc.

Moreover, in a case where the ROM layer on which information is recorded in an on-pit format is reproduced, a polarity of a push-pull signal is positive.

In other words, it can be said that the ROM layer has the pre-pits formed thereon in a recording format that causes the polarity of the push-pull signal to be made positive, which push-pull signal is obtained when the provided information is reproduced.

Moreover, according to the configuration, the antifouling property of the light transmitting layer surface is set based on the rewritable layer. Hence, it is possible to prevent occurrence of problems in the recording of information onto the RE layer or reproducing of information from the RE layer, which problem is caused by the antifouling property just suiting the ROM layer.

The antifouling property and mar-proof property of the light transmitting layer surface set based on the RE layer is, for example, at least an antifouling property and mar-proof property which holds down deterioration in signals to a degree which practically causes no problem in a case where a signal is reproduced from an RE layer of an optical information recording medium, which optical information recording medium has its light transmitting layer surface being subjected to the pseudo-fingerprint adhesion test and abrasion test disclosed in Patent Literature 2.

Generally, a signal modulation factor is higher with the ROM layer than that of the RE layer. Hence, the ROM layer has higher tolerance against noise caused by adhesion of fingerprints and dust on the light incident surface or scratches on the light incident surface. Hence, in a case where the antifouling property and mar-proof property of the light transmitting layer surface are only made to suit the ROM layer, there is a possibility that the recording onto the RE layer and the reproduction of information from the RE layer cannot be properly carried out.

On this account, by having the configuration and/or material of the light transmitting layer surface be selected so as to have the antifouling property and mar-proof property be set based on the rewritable layer as with the foregoing configuration, it is possible to record information onto and reproduce information from the RE layer properly, with an optical information recording medium including a ROM layer and a RE layer.

As such, according to the configuration, on a multi-layer disc that is a BD-format whose recording capacity can be more easily increased than that of a DVD type and also is a combination disc, disc-type identification information and individual identification number (information recorded in BCA recording) are recorded in a format that can be more easily identified as compared to an information recording format used by a user for the information recording layer (L0) that is far from the light incident surface, and the RE layer is provided. Furthermore, a recording format of the pre-pits provided on the ROM layer is of on-pits. In other words, pre-pits are formed on the ROM layer in a recording format which causes the polarity of the push-pull signal to be positive, which push-pull signal is obtained when the provided information is reproduced.

Furthermore, the configuration is one in which antifouling property and mar-proof property on the light transmitting layer surface of the ROM layer causes no problem in recording of information onto the RE layer and reproduction of information from the RE layer.

According to the configuration, a disc type can be easily confirmed by the recording and reproducing apparatus. This makes it possible to share one recording and reproducing apparatus with other types of optical discs. Further, production of the disc becomes easy. In addition, it also is possible to obtain an optical information recording medium in which outdated data on the ROM layer can be replaced by recording, on the RE layer, updated data obtained while an internet connection can be established.

Advantageous Effects of Invention

As described above, an optical information recording medium of the present invention includes, on a substrate: a plurality of information recording layers from which information can be read out by reproduction light; an intermediate layer separating each of the plurality of information recording layers; and a light transmitting layer provided in a position farthest from the substrate, the plurality of information recording layers including a layer allowing only readout of information and a rewritable layer including an area where information is rewritable, the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having pre-pits formed in a recording format in which a polarity of a push-pull signal obtained when provided information is reproduced is positive, and the light transmitting layer having a surface configuration and/or material selected so as to be one with antifouling property and mar-proof property set based on the rewritable layer.

As described above, an optical information recording medium of the present invention includes, on a substrate: a plurality of information recording layers from which information can be read out by reproduction light; an intermediate layer separating each of the plurality of information recording layers; and a light transmitting layer provided in a position farthest from the substrate, the plurality of information recording layers including a layer allowing only readout of information and a rewritable layer including an area where information is rewritable, the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having information recorded thereon in an on-pit format, and the light transmitting layer having a surface configuration and/or material selected so as to be one with antifouling property and mar-proof property set based on the rewritable layer.

As a result, a disc type can be easily confirmed in the recording and reproducing apparatus. This makes it possible to share one recording and reproducing apparatus with other types of optical discs. Further, production of the disc becomes easy. In addition, it also is possible to obtain an optical information recording medium in which outdated data on the ROM layer can be replaced by recording, on the RE layer, updated data obtained while an internet connection is established.

BRIEF DESCRIPTION OF DRAWINGS

FIG. 2
FIG. 2 is a plan view illustrating a configuration of an optical information recording medium of the present invention.

FIG. 7
FIG. 7 is a view schematically illustrating a RE layer in an on-groove recording format.

FIG. 8
FIG. 8 is a view schematically illustrating a ROM layer in an in-pit recording format.

FIG. 9
FIG. 9 is a view schematically illustrating a ROM layer in an on-pit recording format.

FIG. 10
FIG. 10 is a view schematically illustrating a configuration of an optical information recording medium in which a L0 layer is a ROM layer and an L1 layer is a RE layer.

FIG. 14
FIG. 14 is a view illustrating a push-pull signal of a reproduction optical system at a time when the reproduction apparatus reproduces pre-pits, and illustrates a state of a push-pull signal whose polarity is positive.

DESCRIPTION OF EMBODIMENTS

An embodiment of the present invention is described below in detail.

(Outline Configuration of Optical Information Recording Medium 1)

The following description explains a configuration of an optical information recording medium 1 according to an embodiment of the present invention.

Figure 1:
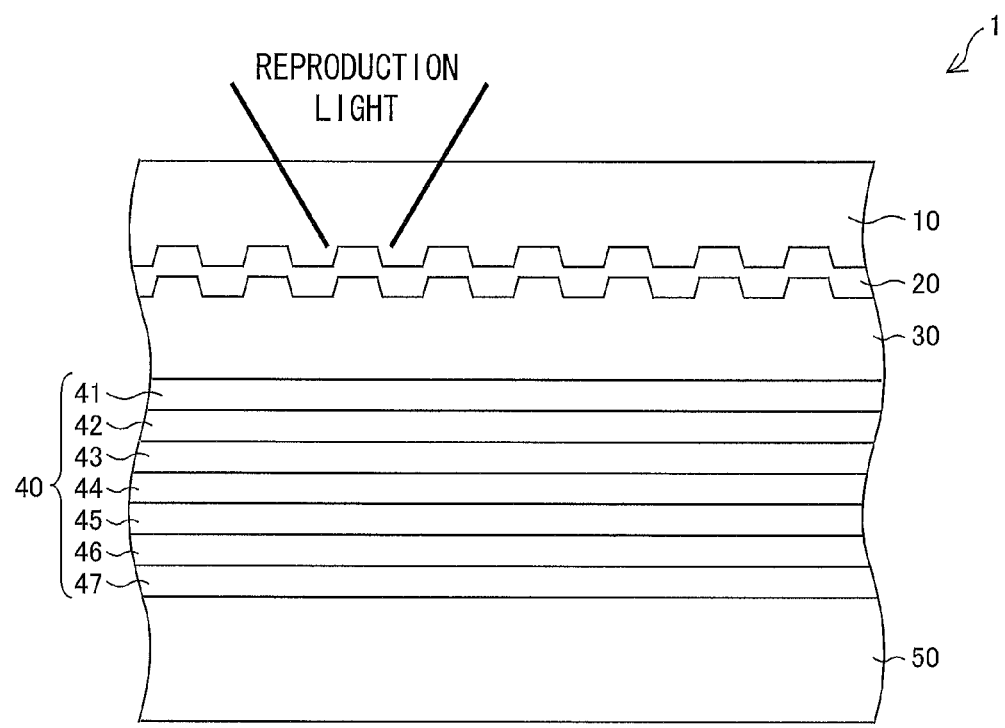
FIG. 1
FIG. 1 is a view schematically illustrating a configuration of an optical information recording medium of the present invention.

FIG. 1 is a view schematically illustrating a configuration of the optical information recording medium 1.

As illustrated in FIG. 1, the optical information recording medium 1 has, on a substrate 50, a ROM layer 20, a RE layer 40, an intermediate layer 30, and a light transmitting layer 10. The ROM layer 20 and the RE layer 40 are a plurality of information recording layers from which information can be read out with use of reproduction light, and the intermediate layer 30 separates the ROM layer 20 and the RE layer 40. Furthermore, the light transmitting layer 10 is provided at a position farthest from the substrate 50. Namely, the optical information recording medium 1 is a combination disc including the ROM layer 20 and the RE layer 40 as the information recording layers. Moreover, a side on which the light transmitting layer 10 is disposed is a side on which reproduction light is incident.

The ROM layer 20 is a layer from which information can only be read out. The RE layer 40 is a rewritable layer including an area in which information can be rewritten. The RE layer 40 is an information recording layer provided on a position farthest from the light transmitting layer 10, and is a recording layer on which disc-type identification information and individual identification number are recorded in a format that can be easily identified as compared to an information recording format used for a layer which only allows for reading out information by light irradiation.

The light transmitting layer 10 is made of, for example, UV curable resin (having a refractive index of 1.50 at reproduction light wavelength of 405 nm) having a thickness of 75 μm. The light transmitting layer 10 may be made of any material as long as the material has high transmittance at the wavelength of the reproduction light. Namely, the light transmitting layer 10 may be formed from, for instance, a polycarbonate film and a transparent adhesive.

Usually, modulation factors of signals differ between that of the ROM layer and that of the RE layer, so therefore tolerance against noise caused by adherence of fingerprints and dust on the light incident surface and scratches generated on the light incident surface also differs between the layers. Generally, the modulation factor of signals is higher in the ROM layer than that in the RE layer, and thus the ROM layer is more tolerant than the RE layer against the noise caused by the adherence of fingerprints and dust on the light incident surface and scratches generated on the light incident surface. Accordingly, if antifouling property and/or mar-proof property of the light transmitting layer surface is to only suit the ROM layer, there may be a possibility that recording onto the RE layer or reproducing from the RE layer may not be carried out properly.

According to the optical information recording medium 1, the antifouling property and the mar-proof property on the surface of the light transmitting layer 10 is set based on the RE layer 40.

Namely, the surface of the light transmitting layer 10 has an antifouling property (property in which reproduction signals and the like from the RE layer 40 do not deteriorate even in a case where fingerprints or the like is adhered thereon) and mar-proof property, each of which does not cause bad effects in the recording onto and reproducing from the RE layer 40.

Hence, it is possible to properly carry out recording of information on the RE layer 40 and reproduction of information read out from the RE layer 40 in the optical information recording medium 1 which is a combination disc including the ROM layer 20 and the RE layer 40.

The antifouling property and mar-proof property on the surface of the light transmitting layer 10 set based on the RE layer 40 is, for example, set so that signal deterioration is held down to a degree in which no practical problem occurs in a case where a pseudo-fingerprint adhesion test or abrasion test disclosed in Patent Literature 2 is carried out on the surface of the light transmitting layer of the optical information recording medium having the RE layer, and a signal is reproduced from the RE layer of that optical information recording medium.

The antifouling property and the mar-proof property of the surface of the light transmitting layer 10 which is set based on the RE layer 40 may be set as appropriate by a person skilled in the art.

Moreover, the antifouling property and the mar-proof property may be attained by providing a hard coating on the surface of the light transmitting layer 10.

Specifically, the antifouling property and mar-proof property are preferably properties which satisfy a standard of antifouling property and mar-proof property for a double-layer BD-RE.

The following describes a specific method of attaining the antifouling property and mar-proof property. A polycarbonate film having a thickness of 50 μm is adhered on a surface of a ROM layer, with a transparent adhesive layer having a thickness of 22 μm. As a hard coating, DeSolite Z7503 (manufactured by JSR Corporation), which is a UV curable resin in which colloidal silica is dispersed, is applied on the surface of the polycarbonate film by spin coating. After drying the resin at 60° C. for 3 minutes to remove diluent solvent, the resin is irradiated with UV rays to cure the resin. Upon curing the resin (thickness of resin which has been cured is 3 μm), fluorine plasma treatment is carried out to attain the foregoing properties. Furthermore, the thickness of the light transmitting layer 10 may be varied in accordance with an optical system included in the reproducing apparatus (driving apparatus) of the optical information recording medium. More specifically, the light transmitting layer 10 may be a polycarbonate substrate having a thickness of 0.6 mm, for example.

The ROM layer 20 is made of, for example, APC (AgPdCu) having a thickness of 9 nm, and is formed on the surface of the intermediate layer 30 by sputtering. The thickness and material of the ROM layer 20 is not limited to the foregoing, and may be any thickness and material as long as the ROM layer 20 has a transmittance and reflectance in the reproduction light wavelength required as the ROM layer 20.

The intermediate layer 30 is made of, for example, transparent UV curable resin (having a refractive index of 1.50 at a reproduction light wavelength) having a thickness of 25 μm. Material of the intermediate layer 30 is not limited to the foregoing, and may be any material as long as the material has a high transmittance at the wavelength of the reproduction light. Moreover, the thickness of the intermediate layer 30 is also not limited to the foregoing, and may be any thickness as long as the thickness is an appropriate thickness which allows for separating each of the information recording layers (in the embodiment, the ROM layer 20 and the RE layer 40), and in which interlayer crosstalk does not become a problem. Interlayer crosstalk denotes a noise from the information recording layer generated from a layer other than the information recording layer that is being reproduced.

Furthermore, the intermediate layer 30 may be a single-layer structure or a multi-layer structure. Moreover, the intermediate layer 30 has, on its surface facing the ROM layer 20, pre-pits made of depressions and protrusions in accordance with information recorded in a specific shape on the ROM layer 20 by a 2P method (photo polymerization).

In the embodiment, the 2P method is a method for transferring the depressions and protrusions on a master disc onto a flat plate, by filling UV curable resin between a flat plate and a master disc, curing the UV curable resin by irradiating the resin with UV ray, and peeling off the master disc from the UV curable resin.

Moreover, a recording format of the pre-pits provided on the ROM layer 20 is on-pit. That it to say, a polarity of a push-pull signal when the ROM layer is to be reproduced is positive.

The polarity of the push-pull signal being positive means a state as follows. In a reproducing apparatus in which a light receiving section of the reproducing signal is separated into two sections so that one is provided on an inner circumference and the other is provided on an outer circumference, and a push-pull signal is calculated by subtracting a voltage obtained from the light receiving section on the inner circumference side from a voltage obtained from the outer circumference, a positive polarity of the push-pull signal allows for attaining levels of the push-pull signal to be 0, positive, 0, negative, and 0 in this order as illustrated in FIG. 14, in a case where the reproducing apparatus jumps from a track reproducing information of the pre-pits to a track closer to the inner circumference. This is a commonly known expression for a person skilled in the art.

FIG. 14 is a view illustrating a push-pull signal of a reproduction optical system at a time when the reproducing apparatus reproduces the pre-pits, and illustrates the state of the push-pull signal whose polarity is positive.

In the case of a combination disc whose information recording layer provided farthest from the light transmitting layer 10 is the RE layer 40, as like the optical information recording medium 1, the recording format of the pre-pits 21 provided on the ROM layer 20 is to be on-pit (having a polarity of the push-pull signal be positive in a case where the ROM layer 20 is to be reproduced). This allows for preventing reproduction failure in the combination disc.

Details of this will be described later.

The RE layer (L0 layer) 40 is, for example, formed by stacking 7 layers of thin film by sputtering or the like. More specifically, the 7 layers of thin film are a first protective film 41 (ZnS—SiO$_2$ having a thickness of 35 nm), a second protective film 42 (ZrO$_2$ having a thickness of 5 nm), a recording layer 43 (GeTe—Sb$_2$Te$_3$ having a thickness of 10 nm), a third protective film 44 (ZrO$_2$ having a thickness of 5 nm), a fourth protective film 45 (ZnS—SiO$_2$ having a thickness of 35 nm), a fifth protective film 46 (ZrO$_2$ having a thickness of 5 nm), and a reflective film 47 (APC (AgPdCu) having a thickness of 20 nm), which are stacked in this order from a side on which reproduction light is incident. Material, thickness, and the number of layers, each of the RE layer 40, are not limited to the foregoing, and may be any material, thickness, and number, as long as the layer functions as a RE layer.

The substrate 50 is, for example a disc-shaped substrate made of polycarbonate, which substrate has a diameter of 120 mm, a thickness of 1.1 mm, and on which grooves are provided. Material and thickness of the substrate 50 is not limited to this, and may be any material and thickness as long as grooves are provided on its surface, and the substrate has a predetermined strength so that the substrate can be used as a substrate. More specifically, the substrate 50 may be made of, for example, polyolefin resin, metal, glass, or like material. Furthermore, the substrate 50 may be of a multi-layer structure.

FIG. 2 is a plan view schematically illustrating a configuration of the optical information recording medium 1.

Figure 3:
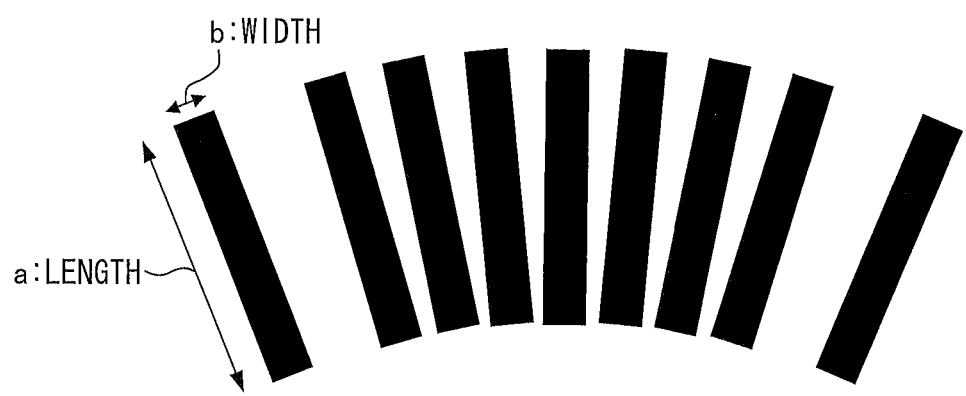
FIG. 3
FIG. 3 is a view schematically illustrating a configuration of an example of a BCA of an optical information recording medium according to an embodiment of the present invention.

FIG. 3 is a view schematically illustrating an example of a BCA provided on the optical information recording medium 1.

As illustrated in FIG. 2, the optical information recording medium 1 includes (i) an area A (contents recording area) which is an area for recording and reproducing normal information, and (ii) an area B which is an area for recording and reproducing information in the BCA.

The area A is an area for recording and reproducing contents information to be used by a user, and is an information recording area which requires tracking when reproducing the information recorded therein.

The area B is a BCA recording area for recording BCA, and is provided on a side closer to the inner circumference on the optical information recording medium 1. The area B is an area on which disc-type identification information and individual identification number (later described) are recorded, and is an area which requires no tracking in reproducing the information.

The BCA is provided on the L0 layer which is provided immediately above the substrate 50.

The BCA is recorded in a format easily identifiable (detectable) than that of an information recording format used for the ROM layer 20. Moreover, the BCA includes the disc-type identification information and the individual identification number. One example of the BCA is illustrated in FIG. 3. In FIG. 3, the arrow a represents length, and the arrow b represents width.

In the optical information recording medium 1, the disc-type identification information and the individual identification information are recorded on the L0 layer which is the information recording layer provided at a position farthest from the light transmitting layer 10.

Hence, it is possible, in a reproducing apparatus by which the disc-type identification information and the individual identification information are reproduced, to have the layer on which the disc-type identification information and the individual identification information are recorded be set in advance among the plurality of the information recording layers. This allows for shortening the time required for the reproducing apparatus to specify the layer on which the disc-type identification information and the individual identification information are recorded among the plurality of information recording layers. Furthermore, it becomes easy to share a single reproducing apparatus among optical information recording mediums of various disc types.

Moreover, according to the configuration, the information recording layer provided at a position farthest from the light transmitting layer 10 is a RE layer. Namely, according to the configuration, the RE layer 40 is disposed as the L0 layer.

Accordingly, it is possible to prevent the RE layer from being peeled off from the intermediate layer or the light transmitting layer disposed as an upper layer or lower layer of the RE layer, which peeling off occurs in the case where the ROM layer is disposed as the L0 layer and at a time when BCA is recorded on the ROM layer. This as a result allows for the reproducing apparatus and like apparatus to properly reproduce the disc-type identification information, the individual identification number, and like information, which are BCA recorded onto the L0 layer (details are later described).

As such, on the optical information recording medium 1 that is a BD-format multi-layer disc whose recording capacity can be more easily increased than that of the DVD-type and also is a combination disc, the disc-type identification information and individual identification number are recorded in a format that can be more easily identified as compared to the information recording format used by the user for the L0 layer, and the RE layer 40 is provided.

According to the configuration, a disc type of the optical information recording medium 1 can be easily confirmed by the recording and reproducing apparatus. This makes it possible to share one recording and reproducing apparatus with other types of optical discs. Further, production of the disc becomes easy. In addition, it also is possible to obtain a combination disc in which outdated data on the ROM layer can be replaced by recording, on the RE layer, updated data obtained while an internet connection can be established.

Moreover, it is possible to prevent recording failure onto the RE layer or signal reproduction failure from the RE layer, and furthermore prevent any reproduction failure such as the recording and reproducing apparatus becoming confused in a case where the layer fails to jump from the ROM layer to the RE layer due to the foregoing reasons.

The optical information recording medium according to the present embodiment is not limited to the foregoing, and may be an information recording medium which has 3 or more layers, provided with a further RE layer and/or ROM layer. In this case, the light transmitting layer and the intermediate layer may differ in thickness from the foregoing thicknesses.

The BCA is an area on which stripes having a width of $\mu m$ units and a length of units of $\mu m$ to units of mm are formed on the RE layer 40 by having the RE layer 40 which serves as the L0 layer be irradiated with pulse laser beams. This as a result forms the BCA on the RE layer 40.

The BCA is made of stripes having a width of $\mu m$ units and a length of several hundred $\mu m$, and so the BCA is greater than the pre-pits formed on the ROM layer 20. Hence, it is possible to read the BCA with the reproducing apparatus even if the focusing of the reproducing apparatus for reproducing the BCA is more or less off, even without carrying out any tracking. Hence, in the ROM layer, the BCA is recorded on the RE layer 40 serving as the L0 layer in a format easily identifiable than the pre-pits used in the ROM layer.

Moreover, in the optical information recording medium 1, the area B is disposed closer to the inner circumference than the area A. That is to say, the BCA is disposed in the vicinity of the inner circumference of the optical information recording medium 1. Hence, it is possible to reduce a recorded amount of the BCA to be recorded on the optical information recording medium 1 as compared to disposing the BCA in the vicinity of the outer circumference of the optical information recording medium 1. This as a result allows for reducing the time required for recording the BCA onto the optical information recording medium 1.

Moreover, an address of the RE layer 40 (rewritable layer) is recorded by having a groove provided on the RE layer 40 meander along a substrate surface direction, and the address of the ROM layer 20 is recorded by use of pre-pits made of depressions and protrusions provided on the ROM layer 20.

The RE layer 40 usually has grooves formed thereon, so that recording marks adjacent to each other in a radius direction do not interfere with each other at a time when information is recorded, or so that reproduction is carried out with good accuracy. Hence, the address information is most easily recorded by meandering the grooves provided on the rewriting layer in the substrate surface direction (hereinafter, referred to as wobble). On the other hand, providing pre-pits on the grooves or providing pre-pits in the middle of the grooves causes the work to become complex, thereby causing an increase in production cost.

Similarly, the ROM layer 20 usually has information recorded by use of pre-pits made of depressions and protrusions. Accordingly, for the similar reasons as described above, it is possible, in recording the address information, to prevent an increase in the production cost by providing the pre-pits having an on-pit recording format.

(Conventional Problem)

The following description deals with a problem occurring in recording information on the BCA of a conventional combination disc, with reference to results of recording onto the BCA of two types of mediums described below, with reference to (a) to (c) of FIG. 4.

Figure 4:
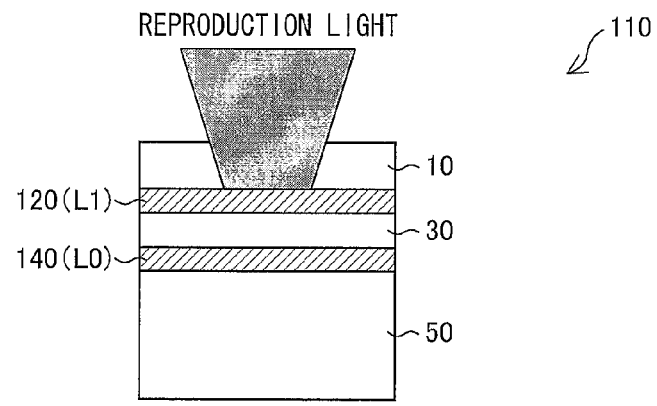
FIG. 4
In FIG. 4(a) is a view schematically illustrating a configuration of an optical information recording medium in which a L0 layer and a L1 layer are each a ROM layer, (b) is a view schematically illustrating a configuration of an optical information recording medium in which a L0 layer and a L1 layer are each a RE layer, and (c) is a view schematically illustrating a configuration of an optical information recording medium in which a L0 layer is a RE layer and a L1 layer is a ROM layer.
Figure 4:
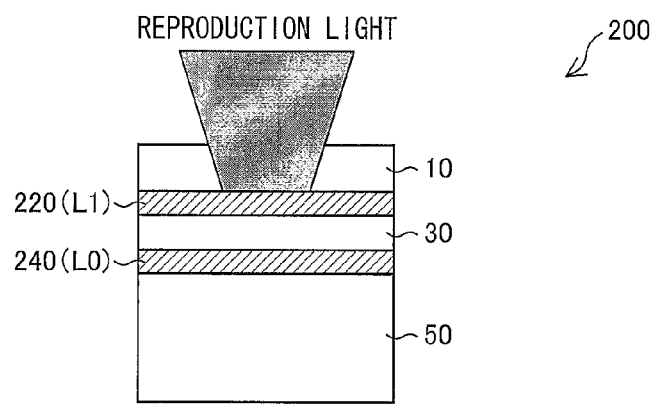
Figure 4:
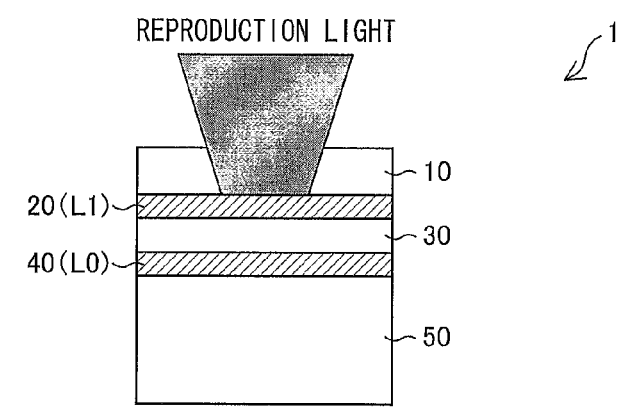

Illustrated in (a) of FIG. 4 is a schematic view of a configuration of an optical information recording medium in which both the L0 layer and the L1 layer are a ROM layer, (b) is a schematic view of a configuration of an optical information recording medium in which both the L0 layer and the L1 layer are a RE layer, and (c) is a schematic view of a configuration of an optical information recording medium in which the L0 layer is a RE layer and the L1 layer is a ROM layer. That is to say, (c) of FIG. 4 illustrates the configuration of the optical information recording medium 1.

As illustrated in (a) of FIG. 4, an optical information recording medium 110 has a light transmitting layer 10, a ROM layer 120, an intermediate layer 30, a ROM layer 140, and a substrate 50 stacked in this order from a side on which the reproduction light is incident.

The light transmitting layer 10 is made of UV curable resin (having a refractive index of 1.50 at a reproduction light wavelength of 405 nm) having a thickness of 75 μm.

The ROM layer 120 is made of APC (AgPdCu) having a thickness of 9 nm. The APC forming the ROM layer 120 is formed as a film on the surface of the intermediate layer 30 by sputtering.

The intermediate layer 30 is made of transparent UV curable resin (having a refractive index of 1.50 at the reproduction light wavelength) having a thickness of 25 μm. Moreover, the intermediate layer 30 has, on its side facing the ROM layer 120, pre-pits made of depressions and protrusions in accordance with information recorded as shapes on the ROM layer 120, by the 2P method.

The ROM layer 140 is made of APC (AgPdCu) having a thickness of 17 nm. The APC forming the ROM layer 140 is formed as a film on the surface of the substrate 50 by sputtering.

As the substrate 50, a disc-shaped substrate made of polycarbonate is used, which substrate is provided with grooves having a size of an outer diameter of 120 mm, an inner diameter of 15 mm, and a thickness of 1.1 mm.

As illustrated in (b) of FIG. 4, the optical information recording medium 200 has a light transmitting layer 10, a RE layer (L1 layer) 220, an intermediate layer 30, a RE layer (L0 layer) 240, and a substrate 50, stacked in this order from the side on which the reproduction light is incident.

The light transmitting layer 10 is made of UV curable resin (having a refractive index of 1.50 at the reproduction light wavelength) having a thickness of 75 μm.

The RE layer (L1 layer) 220 is made of 6 layers of thin film. Although not illustrated, the 6 layers of thin film are a first protective film ($ZnS$—$SiO_2$ having a thickness of 35 nm), a second protective film ($ZrO_2$ having a thickness of 5 nm), a recording layer (GeTe—Sb$_2$Te$_3$ having a thickness of 6 nm), a third protective film (ZrO$_2$ having a thickness of 5 nm), a half-transparent film (APC (AgPdCu) having a thickness of 10 nm), and a transmittance adjusting film (TiO$_2$ having a thickness of 19 nm), stacked in this order from the side on which reproduction light is incident.

The intermediate layer 30 is made of transparent UV curable resin (having a refractive index of 1.50 at a reproduction light wavelength) having a thickness of 25 μm. Moreover, the intermediate layer 30 has, on its side facing the RE layer (L1 layer) 220, grooves provided by the 2P method.

The RE layer (L0 layer) 240 has 7 layers of thin films stacked by sputtering. Although not illustrated, more specifically, the 7 layers of thin films are a first protective film (ZnS—SiO$_2$ having a thickness of 35 nm), a second protective film (ZrO$_2$ having a thickness of 5 nm), a recording layer (GeTe—Sb$_2$Te$_3$ having a thickness of 10 nm), a third protective film (ZrO$_2$ having a thickness of 5 nm), a fourth protective film (ZnS—SiO$_2$ having a thickness of 35 nm), a fifth protective film (ZrO$_2$ having a thickness of 5 nm), and a reflective film (APC (AgPdCu) having a thickness of 20 nm), which films are stacked in this order from the side on which the reproduction light is incident.

As the substrate 50, a disc-shaped substrate made of polycarbonate is used, which substrate is provided with grooves having a size of an outer diameter of 120 mm, an inner diameter of 15 mm, and a thickness of 1.1 mm.

In order to measure a required amount of power to carry out the BCA recording onto a L0 layer in a double-layer medium whose L0 layer is a ROM layer 140, by use of the optical information recording medium 110, the BCA recording was carried out onto the ROM layer 140 of the optical information recording medium 110 while varying the laser power, with use of a BD-RE BCA recording apparatus (ODI-1000 manufactured by Pulstec Industrial Co., Ltd.) as the recording and reproducing apparatus, which apparatus includes a semiconductor laser capable of emitting a laser beam having a wavelength of 808 nm.

However, even with the maximum output of the foregoing BD-RE BCA recording apparatus of 2 W (linear velocity of 3 m/s during BCA recording), it was not possible to carry out the BCA recording onto the ROM layer 140, which layer is the L0 layer of the optical information recording medium 110.

Next, the BCA recording was carried out to the RE layer 240 which serves as the L0 layer of the optical information recording medium 200, with use of the BD-RE BCA recording apparatus at its maximum output of 2 W (linear velocity of 3 m/s during BCA recording). Thereafter, a surface of the optical information recording medium 200 was observed by visual inspection. A result thereof is illustrated in FIG. 5.

Figure 5:
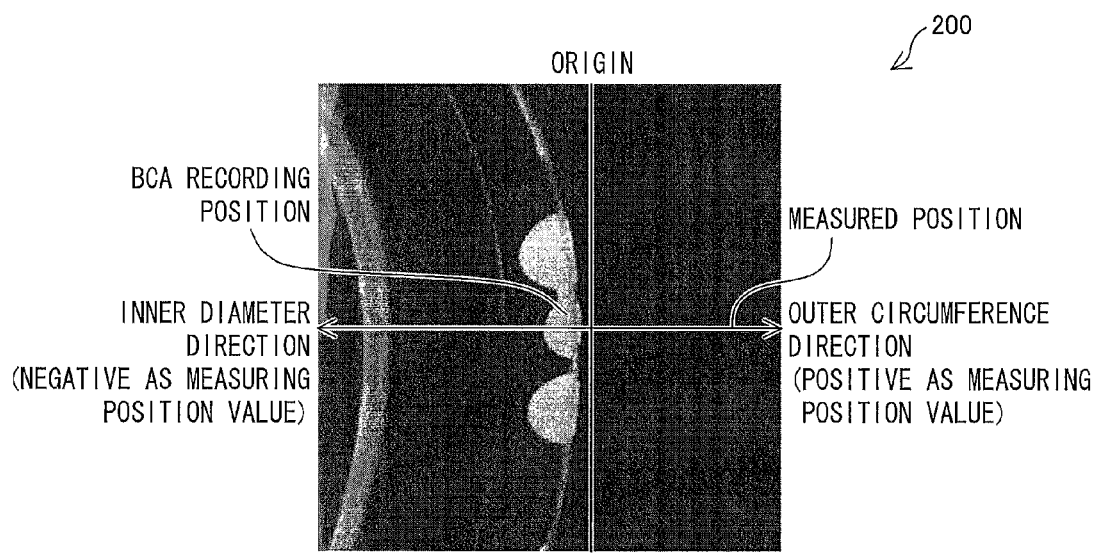
FIG. 5
FIG. 5 is an enlarged view of an essential part, illustrating a condition of a surface of a position on which BCA recording is carried out onto the optical information recording medium illustrated in (a) of FIG. 4.
Figure 6:
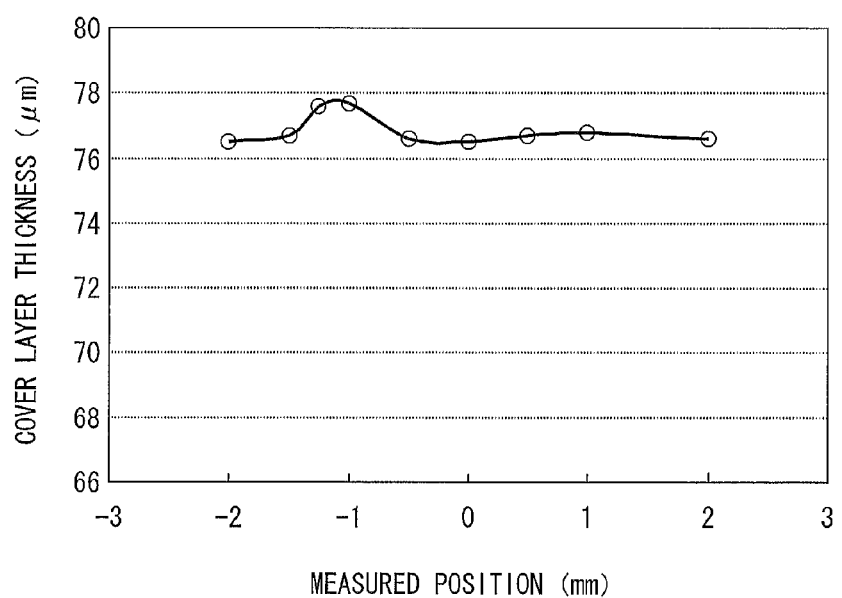
FIG. 6
FIG. 6 is a graph showing a result of measuring a thickness of a light transmitting layer which is a surface of the optical information recording medium illustrated in FIG. 5.

FIG. 5 is a view illustrating an experiment result of the BCA recording carried out on the optical information recording medium 200. Moreover, FIG. 6 is a graph showing a result of measuring the thickness of the light transmitting layer 10 that is the surface layer of the optical information recording medium 200. This thickness was measured along the arrow illustrated in FIG. 5, indicative of the measured location.

Regarding the arrow indicative of the measured location in FIG. 5, a left direction in a front view of the printed drawing is an inner diameter direction of the optical information recording medium 200, and a right direction in the front view of the printed drawing is an outer diameter direction of the optical information recording medium 200. Furthermore, in FIG. 5, the horizontal axis represents a measured position on the optical information recording medium 200, and the vertical axis represents a thickness of the light transmitting layer 10 which is the surface layer of the optical information recording medium 200.

Moreover, the position indicating an origin in FIG. 5 corresponds to a position at which the measured position of the horizontal axis of FIG. 6 is "0". The inner diameter direction of the arrow indicative of the measured position in FIG. 5 corresponds to a negative direction as the measured position in FIG. 6. The outer circumference direction indicative of the measured position in FIG. 5 corresponds to a positive direction as the measured position in FIG. 6.

As illustrated in FIG. 5, it was possible to observe by visual inspection that where the BCA recording was carried out on the optical information recording medium 200, the color had changed.

Moreover, as shown in FIG. 6, it is observable that the thickness of the light transmitting layer 10 is thicker in a thickness in the vicinity of "−1" of the measured position. As clear from the results in FIG. 5 and FIG. 6, the light transmitting layer 10 is increased in thickness at a radial position at which the BCA recording was carried out on the optical information recording medium 200.

This increase can be thought as generated by having the RE layer 220 be peeled off from the light transmitting layer 10 in the L1 layer.

Moreover, for confirmation, the L0 layer at the radial position was made subjected to focus searching by ODU-1000 manufactured by Pulstec Industrial, Co., Ltd., which is a BD evaluation apparatus. A result was that focusing was not possible.

The cause for not being able to carry out focusing on the L0 layer can be considered as that the peeling of the foregoing light transmitting layer 10 hinders the focusing on the RE layer 240 of the L0 layer. Namely, if the light transmitting layer 10 is peeled off, it is impossible to reproduce the information on the L0 layer.

Hence, with the double-layer optical information recording medium in which the L0 layer is a ROM layer and the L1 layer is a RE layer, the BCA recording cannot be carried out while preventing the light transmitting layer from being peeled off. Therefore, substantially no BCA recording can be carried out to the double-layer optical information recording medium in which the L0 layer is a ROM layer and the L1 layer is a RE layer.

In addition, the BCA recording to the ROM layer requires to be carried out with a further high laser power, in a case of a more multi-layered optical information recording medium. The above results show that in a BD-type combination disc including both the RE layer and the ROM layer, if the BCA recording is to be carried out to the L0 layer, the L0 layer cannot be a ROM layer in order to allow sharing of a recording and reproducing apparatus with other types of media.

The above description is a description in a case where a generally used film configuration is applied to the ROM layer. If the ROM layer of the L0 layer is formed to have an identical film configuration as a RE layer to allow writing in on the BCA, the BCA recording to the L0 layer becomes possible, even if the L0 layer is of a ROM layer.

However, this causes a remarkable increase in material costs of the ROM layer, so therefore it is not practical.

The RE layer (L1 layer) 220 is a configuration generally used for the L1 layer of the double-layer BD-RE. Moreover, even if the configuration of the RE layer (L1 layer) 220 is made to be another configuration, there is not much difference in a point that light is absorbed to generate heat. Hence, the result does not change.

Namely, in a BD-type combination disc which includes both the RE layer and the ROM layer, the L0 layer must always be a RE layer.

Moreover, as in (c) of FIG. 4, the optical information recording medium 1 was produced as a BD type combination disc in which the RE layer 40 was provided as the L0 layer, and the ROM layer 20 was provided as the L1 layer. The BCA recording was carried out on the RE layer 40 which serves as the L0 layer, and was confirmed that the BCA recording was carried out without any problems. Namely, it was confirmed that no problems such as the peeling off of the light transmitting layer at parts on which the BCA recording was carried out did not occur, by providing the RE layer 40 as the L0 layer and providing the ROM layer 20 as the L1 layer, as like the optical information recording medium 1.

(Recording Format of Pre-Pits)

The following describes a format of the pre-pits formed on the information recording layer (ROM layer and RE layer).

FIG. 7 is a view schematically illustrating a RE layer of an on-groove recording format. FIG. 8 is a view schematically illustrating a ROM layer of an in-pit recording format. FIG. 9 is a view schematically illustrating a ROM layer of an on-pit recording format.

As in the optical information recording medium 1 illustrated in (c) of FIG. 4, with a combination disc in which the information recording layer provided at a position farthest from the light transmitting layer 10 is the RE layer 40, the recording format of the pre-pits provided on the ROM layer 20 is to be on-pit (having a polarity of a push-pull signal be positive when the ROM layer 20 is reproduced) to allow prevention of reproduction failure in the combination disc.

In order to describe the reason why the reproduction failure is prevented by the foregoing configuration, first, a description is provided regarding a point that a reproduction failure occurs with configurations other than the configuration described above.

For example, in a case of the BD-RE, alloys and the like made up of at least one type of material such as Te, In, Ga, Sb, Se, Pb, Ag, Au, As, Co, Ni, Mo, W, Pd, Ti, Bi, Zn, and Si are generally known widely as material other than those described as used for the recording film (RE layer 40), and many material already exist as known technical knowledge. By applying heat with a recording laser to the material formed as a recording film, a state of the material is caused to change between crystalline and amorphous, and further by irradiating this material changed in state with a reading laser, recorded information is obtainable by a change in reflectance occurring together with the change in state between crystalline and amorphous, from the recording film.

Regarding a direction of grooves to be recorded, if a pitch between grooves 48 on the RE layer 40 is narrow for example 0.32 μm, the direction of the grooves becomes not thermally equivalent between protruded sections (on the grooves 48) and depressed sections (between the grooves 48) in terms of incident light of the recording laser. When a recording mark 49 is recorded on a depressed section, the incident light reaches an adjacent protruded section by going over walls of a corresponding protruded section and depression section. This serves as a cause of cross light. Inevitably, in the RE layer 40, an effective method against cross light is to carry out recording and reproducing with an on-groove format, which is a disposition in which the grooves as like those illustrated in FIG. 7 serve as the protruded sections (a configuration in which recording marks 49 are disposed on the protruded sections). Thus, this becomes a necessity.

Next describes a case of an information recording layer of the optical information recording medium 110 illustrated in (a) of FIG. 4.

In a case where the combination is not as in the foregoing configuration but is a case where the information recording layer provided farthest from the light transmitting layer 10 is the ROM layer 140, i.e. in a case where the ROM layer 140 is provided on the surface of the substrate 50, the recording format of the pre-pits 141 that are provided on the ROM layer 140 is to be in-pit, as illustrated in FIG. 8. The in-pit is a configuration in which the pre-pits 141 are formed so as to be depressed in the opposite direction of the side on which the reproduction light is incident.

This is because, generally, production of a substrate uses injection molding, which this injection molding requires a Ni stamper.

The following describes a preparation method of a Ni stamper used for general optical disc production. First, a master disc using glass or the like is prepared, and the master disc is subjected to a primer process. Thereafter, resist is applied to the master disc and the master disc is baked, to dry the master disc.

Thereafter, the surface of this resist master disc is exposed to light with use of an exposure apparatus using a laser beam or the like, thereafter is developed and then the resist is removed with alkaline solution or the like, whereby forming a pit shape. The pit shape formed at this time is of an in-pit shape. Thereafter, a conductive film process is performed to the resist master disc surface on which the pits are formed, and this resist master disc surface is copied by electroforming to complete the Ni stamper. The pit shape at this time is reversed from the in-pit shape upon development, and becomes an on-pit shape (not illustrated).

Moreover, for example with a recording density (recording density having a shortest mark length of approximately 149 nm at 1-7PP modulation) corresponding to an optical system having a reproduction wavelength of 405 nm and an aperture ratio of 0.85 like a BD-ROM, it becomes extremely difficult to obtain a copy (reverse copy) of the Ni stamper as like the conventional stamper for low density (if it is copied, the recording format of the copied Ni stamper (mother stamper) is reverse copied and would become in-pit).

The reason why it is difficult is as described below.

Generally, the mother stamper of the stamper is obtainable by forming an oxide film on the surface of an initial Ni stamper (father stamper) and then carrying out electroforming on the oxide film.

When the high density recording stamper is copied, a maintenance management more minute than as conventionally is required in the oxide film generation step. This is because, if the oxide film remains on the mother stamper, this would cause a decrease in reproduction signal quality, and the higher the density, the more the effect increases in degree. Moreover, an oxide film is formed on the surface of the father stamp, so in view of signal quality, it is not preferable to use this for production.

Hence, substantially and in terms of cost (use of the mother stamper means that the cost increases), the recording format of the Ni stamper used in the substrate molding becomes on-pit, and thus the recording format of the pre-pits formed on the molded substrate is substantially always in-pit, since the on-pit recording format is reverse copied.

However, the following phenomenon may occur during reproduction in this case, with a combination disc in which the information recording layer provided farthest from the light transmitting layer 10 is a ROM layer.

For instance, the following discusses a case of an optical information recording medium 300 as illustrated in FIG. 10, where the information recording layer provided farthest from the light transmitting layer 10 is a ROM layer 340, and a RE layer 320 is disposed on a side on which reproduction light is incident.

FIG. 10 is a view schematically illustrating a configuration of an optical information recording medium in which the L0 layer is a ROM layer and the L1 layer is a RE layer.

Usually, the RE layer is recorded with recording marks similarly with the ROM layer, at the time of recording information. Hence, in a case where an area in which information of the RE layer is recorded is to be reproduced, the reproduction of the information is carried out under a setting that on-groove recording is carried out.

Next, in a case where a layer jump is carried out from the ROM layer 340 to the RE layer 320 on which information (recording marks 49) is recorded, there is no guarantee that the RE layer 320 will always be focused.

Even if the ROM layer is mistakenly focused, tracking can be carried out on the ROM layer by DPP, which is a regular tracking method for a RE layer. However, if it is tracked at a polarity (positive) of a push-pull signal corresponding to the information recorded on-groove, the ROM layer cannot be reproduced since the recording format of the pre-pits on the ROM layer is the in-pit format (the polarity of the push-pull signal for reproduction is negative). As a result, a problem occurs that no determination can be made for which layer the focus is given on, thereby causing reproduction failure.

On the other hand, in the case of the combination disc (optical information recording medium 1) in which the information recording layer provided farthest from the light transmitting layer 10 is the RE layer 40 as illustrated in (c) of FIG. 4, the ROM layer 20 is formed by a regular 2P method (photopolymerization).

In this case, usually two kinds of methods are used for forming the ROM layer 20.

One is a method in which the Ni stamper is used as a master disc, as with the case of carrying out injection molding (recording format of the pre-pits in the formed ROM layer 20 is in-pit), and another one is a method using, as the master disc, a resin substrate prepared by injection molding using the Ni stamper (recording format of pre-pits on the formed ROM layer 20 is on-pit as illustrated in FIG. 9). Both methods have their merits and demerits, and it is not possible to say which one is better than the other (it is also clear that both methods are being used in actual BD-ROM production). In the embodiment, the on-pit (on-pit format) is a configuration in which the pre-pits 21 are provided as protrusions, on the side on which the reproduction light is incident.

This allows for forming the ROM layer 20 as on-pit without any particular problem. In this case, no reproduction failure as described above occurs.

As such, in the case of the combination disc in which the information recording layer provided farthest from the light transmitting layer 10 is the RE layer 40, by having the recording format of the pre-pit 21 provided on the ROM layer 20 be on-pit (have the polarity of the push-pull signal when reproducing the ROM layer 20 be positive), it is possible to prevent the occurrence of reproduction failure in the combination disc.

(Tracking Path)

The following description deals with a tracking path of the optical information recording medium 1.

Figure 11:
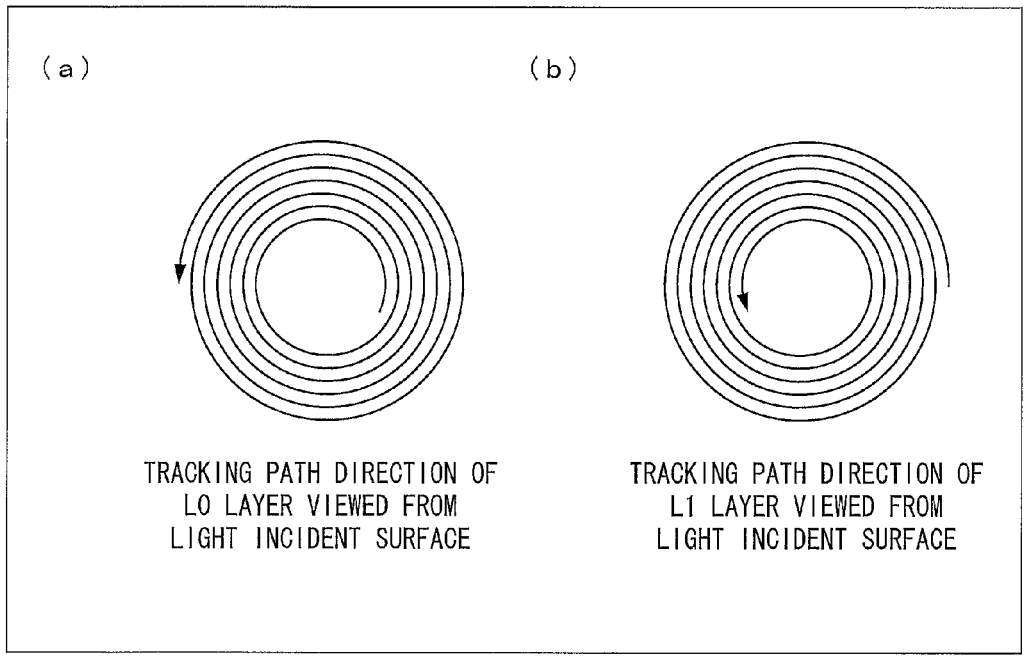
FIG. 11
In FIG. 11(a) and (b) are views of an opposite tracking path; (a) is a view illustrating a tracking path direction of an L0 layer in a case where the L0 layer is viewed from a light incident surface, and (b) is a view illustrating a tracking path direction of a L1 layer in a case where the L1 layer is viewed from the light incident surface.

Illustrated in (a) and (b) of FIG. 11 are views describing an opposite tracking path; (a) of FIG. 11 is a view describing a tracking path direction of the L0 layer in a case where the L0 layer is viewed from a light incident surface perspective, and (b) of FIG. 11 is a view describing a tracking path direction of the L1 layer in a case where the L1 layer is viewed from a light incident surface perspective.

Figure 12:
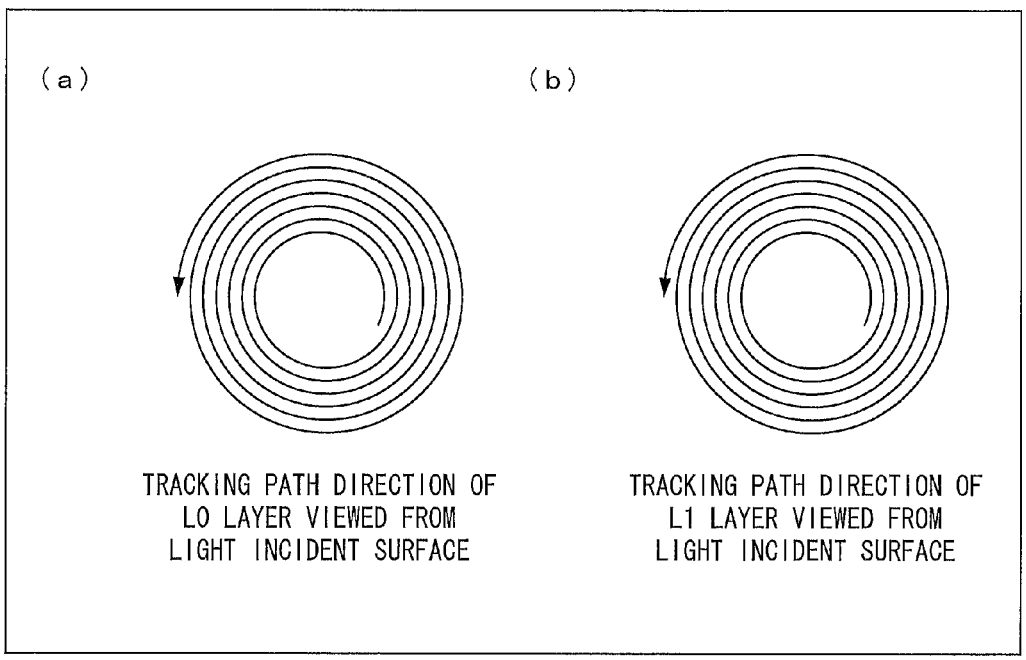
FIG. 12
In FIG. 12(a) and (b) are views describing a parallel tracking path; (a) is a view illustrating a tracking path direction of a L0 layer in a case where the L0 layer is viewed from a light incident surface, and (b) is a view illustrating a tracking path direction of a L1 layer in a case where the L1 layer is viewed from the light incident surface.

Moreover, (a) and (b) of FIG. 12 are views describing a parallel tracking path; (a) of FIG. 12 is a view explaining a tracking path direction of the L0 layer in a case where the L0 layer is viewed from a light incident surface perspective, and (b) of FIG. 12 is a view describing a tracking path direction of the L1 layer in a case where the L1 layer is viewed from a light incident surface perspective.

Figure 13:
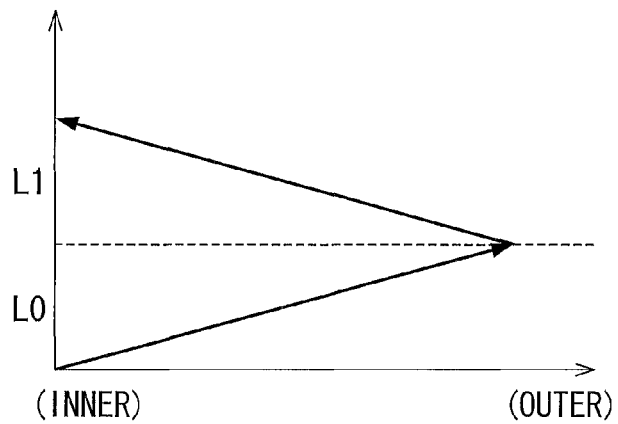
FIG. 13
In FIG. 13(a) is a view illustrating a state of recording and reproduction of information in a case of the opposite tracking path, and (b) is a view illustrating a state of recording and reproducing of information in a case of the parallel tracking path.
Figure 13:
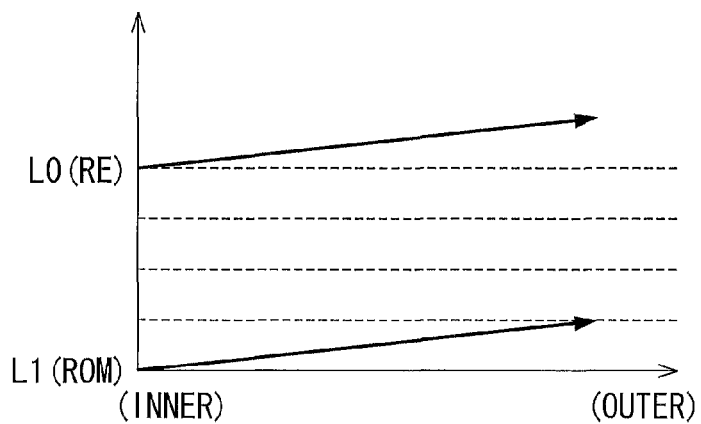

Illustrated in (a) of FIG. 13 is a view describing a state of recording and reproducing information in the case of the opposite tracking path, and (b) of FIG. 13 is a view describing a state of recording and reproducing information in the case of the parallel tracking path.

Generally, a recordable double-layer optical information recording medium employs the opposite tracking path. When a large amount of information is to be continuously recorded for example, recording is started from the inner circumference of the L0 layer, and once the recording is completed to the outermost circumference of the L0 layer, the recording proceeds onto the L1 layer. With the opposite tracking path in which the tracking path direction of the L1 layer is arranged to be from the outer circumference to the inner circumference, layer jumping can be carried out in a manner which hardly has a pickup to move in the radius direction, to continue with the recording.

On the other hand, with the parallel tracking path, upon starting the recording from the inner circumference of the L0 layer and completing the recording up to the outermost circumference of the L0 layer, the recording is subsequently started onto the L1 layer in a tracking path direction from the internal circumference to the outer circumference. Accordingly, the parallel tracking path requires the pickup to move largely in the radius direction. Hence, generally, it is possible to reduce a required recording time in the opposite tracking path, as compared to the parallel tracking path.

Moreover, the same can be said for a reproduction-only double-layer optical information recording medium. Generally, the opposite tracking path is employed also for the reproduction-only double-layer optical information recording medium.

Meanwhile, with a combination disc whose L0 layer is a RE layer and whose L1 layer is a ROM layer, it is preferable that the RE layer and the ROM layer are parallel tracking paths.

Namely, in the optical information recording medium 1, the tracking path direction of the RE layer 40 which is the L0 layer is a direction running from the inner circumference to the outer circumference, and the tracking path of the ROM layer 20 is a parallel tracking path.

Moreover, it is preferable that the optical information recording medium 1 has a read-in area (area B) of the ROM layer 20 be provided closer to the inner circumference than an area A (see FIG. 2) on which contents and the like are recorded.

This is because the optical information recording medium 1 does not record information up to the L1 layer in continuous recording. Even when information recorded on the optical recording medium 1 is reproduced, a supplemental information of the RE layer 40 is used as appropriate in reproducing the information recorded on the ROM layer 20 in a case where the optical information recording medium 1 is used for replacing outdated data on the ROM layer 20 described above by recording, onto the RE layer 40, updated data obtained while Internet connection can be established. Therefore, originally, the optical information recording medium 1 cannot take a method in which continuous reproduction of information is carried out from the ROM layer 20 to the RE layer 40.

Furthermore, in the ROM layer 20, the capacity of the contents would never meet the maximum capacity of the ROM layer 20. Usually, the contents would be of a smaller capacity than the maximum capacity of the ROM layer 20.

In this case, in a case where the tracking path direction runs from the outer circumference to the inner circumference on the ROM layer 20 serving as the L1 layer (in the case of the opposite tracking path), a read-in area for obtaining information to reproduce the ROM layer 20 should be provided at an uppermost part in the tracking path direction, so that the contents can be reproduced promptly upon reproducing the information recorded in the read-in area. Hence, in the case of the opposite tracking path, a read-in area is provided on the outer circumference section of the ROM layer 20, and the inner circumference is left blank.

The read-in area mainly records medium information related to the optical information recording medium, such as medium type information, reproduction condition information, recording condition information, and last sector number information.

The medium type information is information related to type such as R, RE, ROM (in the case of the present embodiment, a combination of the ROM layer and the RE layer), and information related to the number of layers. The reproduction condition information is information of a recommended reproduction laser power, a linear velocity, and the like. The recording condition information is information on a recommended recording power, a recommended recording strategy, and the like. Moreover, the last sector number information is information indicative of an area in the ROM layer on which recording has been carried out.

Generally, when the recording and reproducing apparatus accesses the read-in area of the optical information recording medium, unless the read-in area of the optical information recording medium has a certain width in the radius direction, the recording and reproducing apparatus cannot access the read-in area due to limits in movement accuracy of the pickup which is operated by a servo motor.

Moreover, disc information to be recorded on the read-in area is not that much in amount, and is recorded repetitively so that the information can be quickly reproduced regardless of where on the circumference the reproduction is started. Hence, in a case where read-in areas having identical widths in the radius direction are provided, the number of repeated recording of the disc information remarkably increases in the outer circumference than that in the inner circumference.

That is, in a case where information of an identical capacity is to be recorded, a time for preparing a stamper for an arrangement in which the tracking path direction is arranged to be from the outer circumference to the inner circumference becomes longer than a time for preparing a stamper for an arrangement in which the tracking path direction is arranged to be from the inner circumference to the outer circumference.

The size of the pit used in the current BD-ROM is extremely small. Hence, this cannot be applied with an exposure apparatus used for preparing a DVD, and requires cutting with use of EBR or the like or cutting with use of an inorganic resist.

In a case where the stamper is to be prepared by use of the EBR (electron beam exposure), a corresponding resist is exposed with an electron beam. Hence, it is necessary to irradiate the resist applied on the master disc with a sufficient amount of electron beams. For this reason, the linear velocity for the cutting requires to be extremely slow. For instance, in order to prepare a ROM stamper with a BD capacity of 25 GB, two days of working time is required. As such, if the stamper were to be prepared by EBR, this would require long working hours impossible to compare with the conventional stamper preparation.

Namely, preparation of the stamper so that the tracking path direction runs from the outer circumference to the inner circumference requires an enormous amount of time, thereby causing the preparation cost of the ROM layer to be extremely expensive.

In the BD, a format of a fixed linear velocity is used. Hence, an exposure apparatus is used which has a fixed linear velocity, with similar exposure conditions for forming pits, grooves or the like.

Since the light is exposed with a fixed linear velocity, rotation speed of the exposure apparatus used in the recording varies between the inner circumference and the outer circumference, in accordance with the radial position. For example, in a case where light exposure is carried out with a linear velocity of 4.92 m/sec and at a radial position of 24 mm, the rotation speed is 1957.6 rpm, and at a radial position of 58 mm, the rotation speed is 810 rpm.

In the case described earlier where the ROM layer has its read-in area of the L1 side be provided on an outer circumference side, the time required to carry out the recording in the read-in area would calculate to take at least 2.4 times more recording time, based on a velocity ratio, in a case where a same radial area is required as with a case where the read-in area is provided on an inner circumference side. The same applies with a method of producing the stamper by exposure to light with use of an inorganic resist, which requires fewer working time as compared to EBR.

On the other hand, since many of the tracking path directions of the L0 layer runs from the inner circumference to the outer circumference, and the BCA is provided on the inner circumference to allow sharing with other media, it can be assumed that there are cases where the RE layer is immediately accessed to record information immediately after carrying out the BCA reproduction. Hence, it is preferable that the tracking path direction of the L0 layer runs from the inner circumference to the outer circumference.

Accordingly, it is preferable in the combination disc of the BD type in which both the RE layer and the ROM layer are included, that the RE layer and the ROM layer are parallel tracking paths.

Namely, as in the optical information recording medium 1, it is preferable that the tracking path direction of the RE layer 40 serving as the L0 layer be in a direction in which the tracking path direction runs from the inner circumference to the outer circumference, and that the tracking path of the ROM layer 20 be a parallel tracking path.

Furthermore, with a case where further more RE layers and ROM layers are included in combination, it is preferable that, for the similar reason, the ROM layer provided at a farthest position from the light transmitting layer out of the plurality of ROM layers has a relationship in that its track path direction is parallel to the tracking path direction of the RE layer provided farthest from the light transmitting layer, out of the information recording layers provided in the optical information recording medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, an optical information recording medium of the present invention includes, on a substrate: a plurality of information recording layers from which information can be read out by reproduction light; an intermediate layer separating each of the plurality of information recording layers; and a light transmitting layer provided in a position farthest from the substrate, the plurality of information recording layers including a layer allowing only readout of information and a rewritable layer including an area where information is rewritable, the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having pre-pits formed in a recording format in which a polarity of a push-pull signal obtained when provided information is reproduced is positive, and the light transmitting layer having a surface configuration and/or material selected so as to be one with antifouling property and mar-proof property set based on the rewritable layer.

As described above, an optical information recording medium of the present invention includes, on a substrate: a plurality of information recording layers from which information can be read out by reproduction light; an intermediate layer separating each of the plurality of information recording layers; and a light transmitting layer provided in a position farthest from the substrate, the plurality of information recording layers including a layer allowing only readout of information and a rewritable layer including an area where information is rewritable, the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having information recorded thereon in an on-pit format, and the light transmitting layer having a surface configuration and/or material selected so as to be one with antifouling property and mar-proof property set based on the rewritable layer.

The disc-type identification information is information for identifying a disc type. Namely, the disc-type identification information is information indicative of the number of information recording layers provided on the disc, the types (e.g. ROM, R, RE) of the provided information recording layers, and information of dispositions of a layer allowing only readout of the information (hereinafter, referred to as ROM layer) and a rewritable layer (hereinafter, referred to as RE layer) including an area in which the information is rewritable, among the plurality of information recording layers. The disc-type identification information is information for identifying the type of the optical information recording medium.

Moreover, the individual identification number is a number for identifying an individual optical information recording medium, and it is preferably recorded on the optical information recording medium at the same time as the BCA recording. By use of the individual identification number as appropriate, it is possible to prevent any unauthorized dubbing or the like onto the RE layer.

According to the configuration, the disc-type identification information and the individual identification information are recorded on an information recording layer (hereinafter, referred to as L0 layer) provided in a position farthest from the light transmitting layer.

Hence, it is possible, in a reproducing apparatus by which the disc-type identification information and the individual identification information are reproduced, to have the layer on which the disc-type identification information and the individual identification information are recorded be set in advance among the plurality of the information recording layers. This allows for shortening the time required for the reproducing apparatus to specify the layer on which the disc-type identification information and the individual identification information are recorded among the plurality of information recording layers. Furthermore, it becomes easy to share a single reproducing apparatus among optical information recording mediums of various disc types.

Moreover, according to the configuration, the information recording layer provided at a position farthest from the light transmitting layer is a RE layer. Namely, according to the configuration, the RE layer is disposed as the L0 layer.

Accordingly, it is possible to prevent the RE layer from being peeled off from the intermediate layer or the light transmitting layer disposed as an upper layer or lower layer of the RE layer, which peeling off occurs in the case where the ROM layer is disposed as the L0 layer and at a time when BCA is recorded on the ROM layer. This as a result allows for the reproducing apparatus and like apparatus to properly reproduce the disc-type identification information, the individual identification number, and like information, which are BCA recorded onto the L0 layer.

Furthermore, in the configuration, information is recorded on the ROM layer in an on-pit format. Namely, pre-pits formed on the ROM layer are shaped of protrusions.

Hence, it is possible to reproduce information on the ROM layer and prevent reproduction failure of the combination disc, even if the reproducing apparatus fails to jump from the ROM layer to the RE layer during reproduction by the reproducing apparatus and the ROM layer is again focused by mistake, caused by reasons described later.

This allows for preventing reproduction failure in the combination disc.

Moreover, in a case where the ROM layer on which information is recorded in an on-pit format is reproduced, a polarity of a push-pull signal is positive.

In other words, it can be said that the ROM layer has the pre-pits formed thereon in a recording format that causes the polarity of the push-pull signal to be made positive, which push-pull signal is obtained when the provided information is reproduced.

Moreover, according to the configuration, the antifouling property of the light transmitting layer surface is set based on the rewritable layer. Hence, it is possible to prevent occurrence of problems in the recording of information onto the RE layer or reproducing of information from the RE layer, which problem is caused by the antifouling property just suiting the ROM layer.

The antifouling property and mar-proof property of the light transmitting layer surface set based on the RE layer is, for example, at least an antifouling property and mar-proof property which holds down deterioration in signals to a degree which practically causes no problem in a case where a signal is reproduced from an RE layer of an optical information recording medium, which optical information recording medium has its light transmitting layer surface been subjected to the pseudo-fingerprint adhesion test and abrasion test disclosed in Patent Literature 2.

Generally, a signal modulation factor is higher with the ROM layer than that of the RE layer. Hence, the ROM layer has higher tolerance against noise caused by adhesion of fingerprints and dust on the light incident surface or scratches on the light incident surface. Hence, in a case where the antifouling property and mar-proof property of the light transmitting layer surface are only made to suit the ROM layer, there is a possibility that the recording onto the RE layer and the reproduction of information from the RE layer cannot be properly carried out.

On this account, by having the configuration and/or material of the light transmitting layer surface be selected so as to have the antifouling property and mar-proof property be set based on the rewritable layer as with the foregoing configuration, it is possible to record information onto and reproduce information from the RE layer properly, with an optical information recording medium including a ROM layer and a RE layer.

As such, according to the configuration, on a multi-layer disc that is a BD-format whose recording capacity can be more easily increased than that of a DVD type and also is a combination disc, disc-type identification information and individual identification number (information recorded in BCA recording) are recorded on the information recording layer (L0) that is far from the light incident surface in a format that can be more easily identified as compared to an information recording format used by a user, and the disc is also provided with the RE layer. Furthermore, a recording format of the pre-pits provided on the ROM layer is of on-pits. In other words, pre-pits are formed on the ROM layer in a recording format which causes the polarity of the push-pull signal to be positive, which push-pull signal is obtained when the provided information is reproduced.

Furthermore, the configuration is one in which antifouling property and mar-proof property on the light transmitting layer surface of the ROM layer causes no problem in recording of information onto the RE layer and reproduction of information from the RE layer.

According to the configuration, a disc type can be easily confirmed by the recording and reproducing apparatus. This makes it possible to share one recording and reproducing apparatus with other types of optical discs. Further, production of the disc becomes easy. In addition, it also is possible to obtain an optical information recording medium in which outdated data on the ROM layer can be replaced by recording, on the RE layer, updated data obtained while an internet connection can be established.

The optical information recording medium of the present invention furthermore is preferably configured in such a manner that the format allowing easier determination is a format for recording information by irradiating the information recording layer with pulse laser light and forming a stripe having a width in a unit of $\mu m$ and a length in a unit of $\mu m$ to a unit of mm.

According to the foregoing configuration, even if a radial direction position of the focusing or reproduction light irradiation is slightly off at a time when reproducing the optical information recording medium with the reproducing apparatus to read out the disc-type identification information and individual identification number, the disc-type identification information and the individual identification number can be read out by the reproducing apparatus.

Furthermore, the optical information recording medium of the present invention is preferably configured in such a manner that the disc-type identification information and the individual identification number be recorded on a radial position inner of an information recording area which requires tracking for reproducing information.

In other words, it is preferable that a radial position on which the disc-type identification information and the individual identification number are recorded is provided inner of an information recording area that requires tracking in order to reproduce information.

According to the configuration, the disc-type identification information and the individual identification number are provided in the vicinity of the inner circumference of the optical information recording medium. Hence, as compared to a case where the disc-type identification information and the individual identification number are provided on an outer side of the information recording area, that is, in the vicinity of the outer circumference of the optical information recording medium, it is possible to shorten the time required for recording the disc-type identification information and the individual identification number onto the optical information recording medium, and further increases the information recording capacity.

Moreover, the optical information recording medium of the present invention is preferably configured in such a manner that the information recording layer provided farthest from the light transmitting layer has a tracking path direction running from the inner circumference to the outer circumference of the optical information recording medium, and the layer allowing only readout of information, provided in a position farthest from the light transmitting layer, has a parallel tracking path direction with respect to the tracking path direction of the information recording layer.

According to the configuration, it is possible to start cutting in the vicinity of the inner circumference at a time of preparing a stamper required for preparation of a layer which can only read out information, which layer is provided at a farthest position from the light transmitting layer out of the layers allowing only readout of the information. This makes the cutting easy in an accuracy point of view and allows for reducing production costs, as compared to starting the cutting from the vicinity of the outer circumference section, except for the case where information is recorded on the entire information recording area.

Moreover, it is preferable that the layer allowing only readout of information has a read-in area provided in an inner circumference section on an inner side of a content recording area.

According to the configuration, medium information (information such as medium type information, reproduction condition information, and last sector number information) recorded on the read-in area is provided in the vicinity of the inner circumference of the optical information recording medium. Hence, since the medium information can be recorded in the vicinity of the inner circumference at the time of preparing a stamper necessary for production of the layer allowing only readout of information as compared to providing the medium information on an outer circumference side of the information recording area, it is possible to reduce the time required for producing the stamper, whereby allowing for reducing production costs, and further increasing the information recording capacity.

This is because, the medium information is required for reproducing contents information recorded on the information recording area. Accordingly, it is necessary to reproduce the medium information promptly.

Since it is preferable that the medium information can be reproduced without any confirmation of the address on this account, identical information is repetitively recorded in an area having a set width in a radial direction (determined by accuracy of a servomotor or the like which causes the pickup to move in the radial direction; e.g. a width of several hundred μm units) so that the information can be reproduced immediately regardless of where in the circumference the reproduction is started. If the medium information is provided in the vicinity of the outer circumference, a broader area becomes required, and more information requires to be recorded.

The optical information recording medium of the present invention is preferably configured in such a manner that the rewritable layer have its address be recorded by meandering a groove provided on the rewritable layer along a substrate surface direction, and the layer allowing only readout of information have its address be recorded by use of pre-pits made of depressions and protrusions provided on the layer allowing only readout of information.

In the invention, the RE layer usually has grooves provided so that recording marks adjacent to each other in the radial direction at the time of information recording do not interfere with each other, or to allow reproduction of information with good accuracy. Hence, the easiest way to record address information is by meandering the grooves that are provided on the rewritable layer along a substrate surface direction (hereinafter, referred to as wobble). On the other hand, providing pre-pits on the grooves or providing pre-pits in the middle of the grooves makes the operation complex, thereby causing an increase in production cost.

Similarly, the ROM layer has information recorded generally by use of pre-pits made of depressions and protrusions. For the similar reasons as the above, it is possible to prevent the production costs from increasing in recording the address information, as compared to providing pre-pits on the grooves or providing pre-pits on the middle of the grooves.

Industrial Applicability

The present invention is applicable to a combination disc.

Reference Signs List 1 optical information recording medium
10 light transmitting layer
20 ROM layer
21 pre-pit
30 intermediate layer
40 RE layer (rewritable layer)
50 substrate

The invention claimed is:

1. An optical information recording medium comprising, on a substrate:
  a plurality of information recording layers from which information can be read out by reproduction light;
  an intermediate layer separating each of the plurality of information recording layers; and
  a light transmitting layer provided in a position farthest from the substrate,
  the plurality of information recording layers including a layer allowing only readout of information and a rewritable layer including an area where information is rewritable,
  the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation,
  the layer allowing only readout of information, having pre-pits formed in a recording format in which a polarity of a push-pull signal obtained when provided information is reproduced is positive, and
  the light transmitting layer having a surface configuration and/or material selected so as to be one with antifouling property and mar-proof property set based on the rewritable layer.

2. The optical information recording medium according to claim 1, wherein the format allowing easier determination is a format for recording information by irradiating the information recording layer with pulse laser light and forming a stripe having a width in a unit of μm and a length in a unit of μm to a unit of mm.

3. The optical information recording medium according to claim 1, wherein
  the disc-type identification information and the individual identification number being recorded on a radial position inner of an information recording area which requires tracking for reproducing information.

4. The optical information recording medium according to claim 1, wherein
  the information recording layer provided farthest from the light transmitting layer has a tracking path direction running from the inner circumference to the outer circumference of the optical information recording medium, and the layer allowing only readout of information, provided in a position farthest from the light transmitting layer, has a parallel tracking path direction with respect to the tracking path direction of the information recording layer.

5. The optical information recording medium according to claim 1, wherein
  the layer allowing only readout of information has a read-in area provided in an inner circumference section on an inner side of a content recording area.

6. The optical information recording medium according to claim 1, wherein
  the rewritable layer has its address be recorded by meandering a groove provided on the rewritable layer along a substrate surface direction, and the layer allowing only readout of information has its address be recorded by use of pre-pits made of depressions and protrusions provided on the layer allowing only readout of information.

7. An optical information recording medium comprising, on a substrate:
  a plurality of information recording layers from which information can be read out by reproduction light;
  an intermediate layer separating each of the plurality of information recording layers; and
  a light transmitting layer provided in a position farthest from the substrate,
  the plurality of information recording layers including a layer allowing only readout of information and a rewritable layer including an area where information is rewritable,
  the rewritable layer including an area where information is rewritable, being an information recording layer provided in a position farthest from the light transmitting layer and also being a recording layer of disc type identification information and an individual identification number recorded in a format allowing easier detection as compared to an information recording format used for the layer allowing only readout of information by use of light irradiation, the layer allowing only readout of information, having information recorded thereon in an on-pit format, and the light transmitting layer having a surface configuration and/or material selected so as to be one with antifouling property and mar-proof property set based on the rewritable layer.

8. The optical information recording medium according to claim 7, wherein the format allowing easier determination is a format for recording information by irradiating the information recording layer with pulse laser light and forming a stripe having a width in a unit of μm and a length in a unit of μm to a unit of mm.

9. The optical information recording medium according to claim 7, wherein the disc-type identification information and the individual identification number being recorded on a radial position inner of an information recording area which requires tracking for reproducing information.

10. The optical information recording medium according to claim 7, wherein the information recording layer provided farthest from the light transmitting layer has a tracking path direction running from the inner circumference to the outer circumference of the optical information recording medium, and the layer allowing only readout of information, provided in a position farthest from the light transmitting layer, has a parallel tracking path direction with respect to the tracking path direction of the information recording layer.

11. The optical information recording medium according to claim 7, wherein the layer allowing only readout of information has a read-in area provided in an inner circumference section on an inner side of a content recording area.

12. The optical information recording medium according to claim 7, wherein the rewritable layer has its address be recorded by meandering a groove provided on the rewritable layer along a substrate surface direction, and the layer allowing only readout of information has its address be recorded by use of pre-pits made of depressions and protrusions provided on the layer allowing only readout of information.

* * * * *